US011115598B2

(12) United States Patent
Yim

(10) Patent No.: US 11,115,598 B2
(45) Date of Patent: Sep. 7, 2021

(54) ELECTRONIC DEVICE AND METHOD FOR CHANGING MAGNIFICATION OF IMAGE USING MULTIPLE CAMERAS

(71) Applicant: Samsung Electronics Co., Ltd., Gyeonggi-do (KR)

(72) Inventor: Sunggeun Yim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/793,216

(22) Filed: Feb. 18, 2020

(65) Prior Publication Data

US 2020/0267326 A1    Aug. 20, 2020

(30) Foreign Application Priority Data

Feb. 19, 2019  (KR) .......................... 10-2019-0019527

(51) Int. Cl.
*H04N 5/232*  (2006.01)
*H04N 5/247*  (2006.01)

(52) U.S. Cl.
CPC ....... *H04N 5/232933* (2018.08); *H04N 5/247* (2013.01)

(58) Field of Classification Search
CPC ............. H04N 5/232933; H04N 5/247; H04N 5/23216; H04N 5/23287; H04N 5/2257; H04N 5/232935; H04N 5/23296; H04N 5/232939; H04N 5/23212; H04N 5/23219; H04M 1/026; H04M 1/0264; H04M 1/0266

See application file for complete search history.

(56) References Cited

U.S. PATENT DOCUMENTS 9,716,825 B1   7/2017  Manzari et al.
10,194,089 B2  1/2019  Nash et al.
(Continued)

FOREIGN PATENT DOCUMENTS

KR  10-2014-0030861 A  3/2014
KR  10-2018-0027978 A  3/2018
(Continued)

OTHER PUBLICATIONS

International Search Report dated Jun. 10, 2020.
European Search Report dated Jul. 2, 2020.

*Primary Examiner* — Timothy J Henn
(74) *Attorney, Agent, or Firm* — Cha & Reiter, LLC

(57) ABSTRACT

An electronic device and method are disclosed. The device includes a display, a plurality of cameras, a memory storing instructions, and at least one processor. The processor implements the method, including: displaying on the display, a preview of a first image acquired using a first camera from among the plurality of cameras, receiving a first input while the preview is displayed, wherein the first input is received before reception of a second input adjusting a magnification level of the preview, in response to receiving the first input, activating a second camera from among the plurality of cameras, receiving the second input for adjusting the magnification of the preview when a second image, distinct from the first image, is acquired using the activated second camera, and displaying the preview, based on at least a part of the second image and at least partially based on receiving the second input.

20 Claims, 16 Drawing Sheets

(56) References Cited

U.S. PATENT DOCUMENTS

| | | | |
|---|---|---|---|
| 10,944,908 B2* | 3/2021 | An | G06T 7/80 |
| 2006/0056056 A1* | 3/2006 | Ahiska | G08B 13/19643 |
| | | | 359/690 |
| 2006/0187312 A1* | 8/2006 | Labaziewicz | H04N 5/2258 |
| | | | 348/218.1 |
| 2008/0025712 A1* | 1/2008 | Furuya | H04N 5/23209 |
| | | | 396/88 |
| 2015/0109468 A1* | 4/2015 | Laroia | H04N 5/345 |
| | | | 348/208.6 |
| 2017/0230585 A1 | 8/2017 | Nash et al. | |
| 2018/0146132 A1 | 5/2018 | Manzari et al. | |
| 2018/0227489 A1* | 8/2018 | Ho | G03B 13/02 |
| 2018/0376122 A1 | 12/2018 | Park et al. | |
| 2019/0045135 A1 | 2/2019 | Ryu et al. | |
| 2019/0082101 A1* | 3/2019 | Baldwin | H04N 5/23216 |

FOREIGN PATENT DOCUMENTS

| | | |
|---|---|---|
| KR | 10-2018-0109918 A | 10/2018 |
| KR | 10-2018-0132982 A | 12/2018 |

\* cited by examiner

ELECTRONIC DEVICE AND METHOD FOR CHANGING MAGNIFICATION OF IMAGE USING MULTIPLE CAMERAS

CROSS-REFERENCE TO RELATED APPLICATION(S)

This application is based on and claims priority under 35 U.S.C. 119 to Korean Patent Application No. 10-2019-0019527, filed on Feb. 19, 2019, in the Korean Intellectual Property Office, the disclosure of which is herein incorporated by reference in its entirety.

BACKGROUND

1) Field

Certain embodiments described below relate to an electronic device for changing the magnification of an image using a plurality of cameras, and a method therefor.

2) Description of Related Art

Recently, with the development of digital technology, various types of electronic devices, such as a mobile communication terminal, a smart phone, a tablet PC, an electronic notebook, a personal digital assistant, and a wearable device, have come to be widely used. The electronic device may include one or more cameras for capturing an image and/or a video.

The above information is presented as background information only to assist with an understanding of the disclosure. No determination has been made, and no assertion is made, as to whether any of the above might be applicable as prior art with regard to the disclosure.

SUMMARY

Each camera in the electronic device have include its own field-of-view (FOV). If multiple FOVs for a plurality of cameras at least partially overlap one another, and the supported magnification ranges of each cameras differ, then during adjustment of magnification, the electronic device could switch between the available cameras to achieve the desired magnification. However, there may be delays in switching between the cameras due to the time needed for activation of the camera.

The technical subjects pursued in the disclosure are not limited to the above mentioned technical subjects, and other technical subjects which are not mentioned may be clearly understood, through the following descriptions, by those skilled in the art of the disclosure.

According to certain embodiments, an electronic device may include: display; a plurality of cameras; a memory for storing instructions; and at least one processor operably coupled with the display, the plurality of cameras, and the memory, the instructions executable by the at least one processor to cause the electronic device to display, on the display, a preview of a first image acquired using a first camera from among the plurality of cameras, receive a first input while the preview is displayed, wherein the first input is received before reception of a second input adjusting a magnification level of the preview, in response to receiving the first input, activate a second camera from among the plurality of cameras, receive the second input for adjusting the magnification of the preview when a second image, distinct from the first image, is acquired using the activated second camera, and display the preview, based on at least a part of the second image and at least partially based on receiving the second input.

A method of an electronic device according to certain embodiments may include: displaying, on a display of the electronic device, a preview of a first image acquired from a first camera among a plurality of cameras of the electronic device, receiving a first input while the preview is displayed, wherein the first input is received before reception of a second input adjusting a magnification level of the preview, in response to receiving the first input, activating a second camera among the plurality of cameras, receiving the second input adjusting the magnification level of the preview while a second image, distinct from the first image, is acquired using the activated second camera, and displaying the preview, based on at least a part of the second image and at least partially based on receiving the second input.

An electronic device and a method therefor according to certain embodiments may activate a camera before receiving user input for adjusting a magnification and thus prevent the user from noticing a delay attributable to activation of the camera, so as to provide enhanced usability.

The effects which can be acquired by the disclosure are not limited to the above described effects, and other effects that have not been mentioned may be clearly understood by those skilled in the art from the following description.

BRIEF DESCRIPTION OF THE DRAWINGS

For a more complete understanding of the disclosure and its advantages, reference is now made to the following description taken in conjunction with the accompanying drawings, in which like reference numerals represent like parts, and.

DETAILED DESCRIPTION

Figure 1:
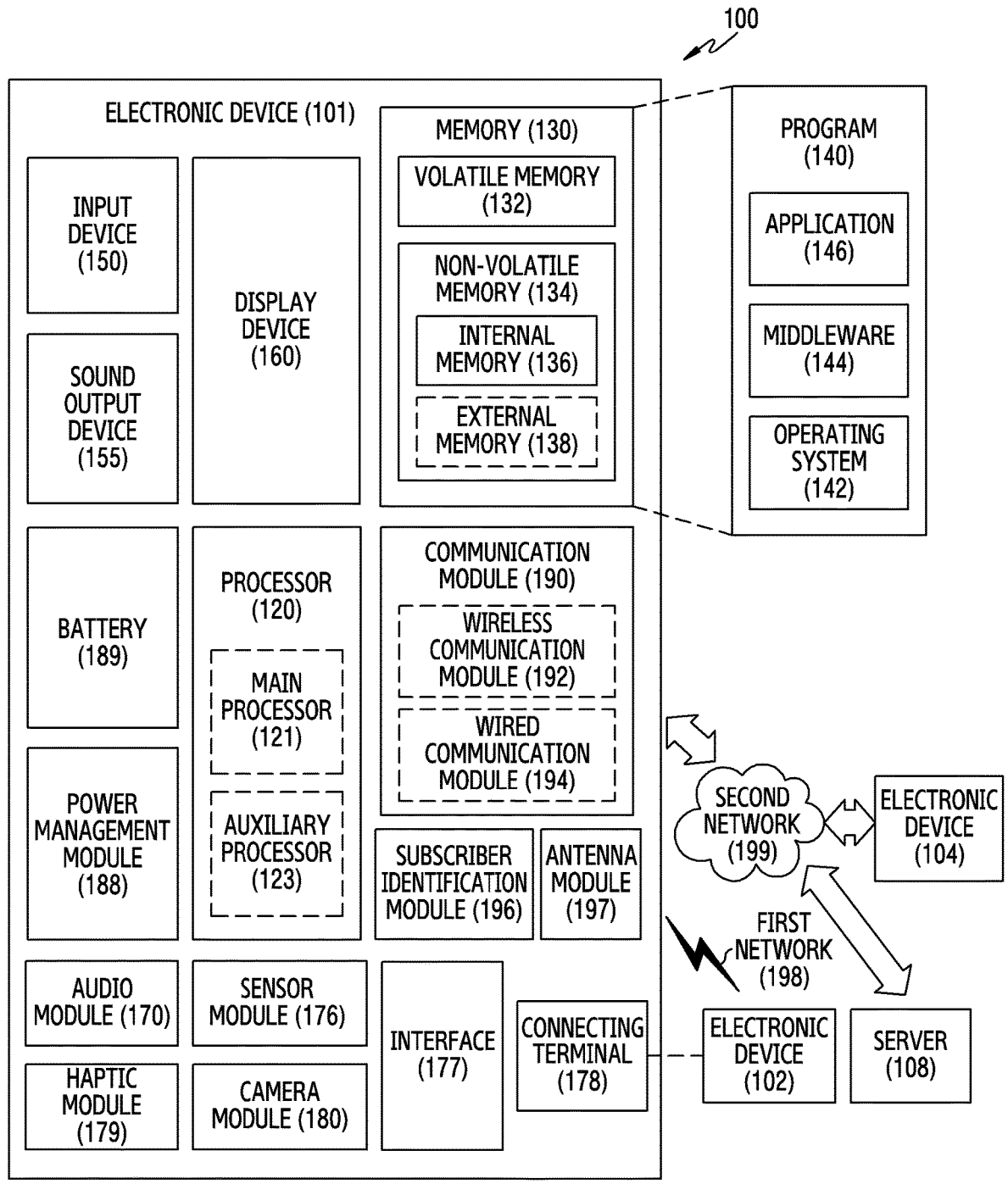
FIG. 1 is a block diagram of an electronic device in a network environment according to certain embodiments.

Hereinafter, certain embodiments of this document will be described with reference to the accompanying drawings. However, it should be understood that technology described in this document is not limited to a specific embodiment and includes various modifications, equivalents, and/or alternatives of an embodiment of this document. The same reference numbers are used throughout the drawings to refer to the same or like parts.

In this document, an expression such as "have," "may have," "comprise," or "may comprise" indicates existence of a corresponding characteristic (e.g., constituent element such as a numerical value, function, operation, or component) and does not exclude the presence of another characteristic.

In this document, an expression such as "A or B", "at least one of A or/and B", or "one or more of A or/and B" may include all possible combinations of together listed items. For example, "A or B," "at least one of A and B," or "one or more of A or B" may indicate all of (1) a case of including at least one A, (2) a case of including at least one B, and (3) a case of including both at least one A and at least one B.

An expression such as "first" and "second" used in this document may indicate various constituent elements regardless of order and/or importance, is used for distinguishing a constituent element from another constituent element, and does not limit corresponding constituent elements. For example, a first user device and a second user device may represent another user device regardless of order and/or importance. For example, a first constituent element may be referred to as a second constituent element without deviating from the description provided in this document and, similarly, a second constituent element may be referred to as a first constituent element.

When it is described that a constituent element (e.g., a first constituent element) is "(operatively or communicatively) coupled with/to" or is "connected to" another constituent element (e.g., a second constituent element), it should be understood that the constituent element may be directly connected to the another constituent element or may be connected to the another constituent element through another constituent element (e.g., a third constituent element). However, when it is described that a constituent element (e.g., a first constituent element) is "directly connected" or is "directly accessed" to another constituent element (e.g., a second constituent element), it may be understood that another constituent element (e.g., a third constituent element) does not exist between the constituent element and the other constituent element.

An expression "configured to" used in this document may be interchangeably used with, for example, "suitable for", "having the capacity to", "designed to", "adapted to", "made to", or "capable of" according to a situation. A term "configured to" does not always mean "specifically designed to" in hardware. Alternatively, in any situation, an expression "device configured to" may mean that the device is "capable of" being configured together with another device or component. For example, a "processor configured to perform phrases A, B, and C" may be a generic-purpose processor (e.g., CPU or application processor) that executes an exclusive processor (e.g., an embedded processor) for performing a corresponding operation or at least one software program stored at a memory device to perform a corresponding operation.

Terms used in this document are used for describing a specific embodiment and do not limit a range of another embodiment. Unless the context otherwise clearly indicates, words used in the singular include the plural, and the plural includes the singular. Terms used here including a technical or scientific term have the same meaning as that which may be generally understood by a person of common skill in the art. Terms defined in a general dictionary among terms used in this document may be analyzed as the same meaning as or a meaning similar to that in a context of related technology, and unless it is clearly defined in this document, the term is not analyzed as having an ideal or excessively formal meaning. In some cases, a term defined in this document cannot be analyzed to exclude the embodiments of this document.

An electronic device according to certain embodiments of this document may include at least one of, for example, a smart phone, tablet personal computer (tablet PC), mobile phone, video phone, e-book reader, desktop PC, laptop PC, netbook computer, workstation, server, personal digital assistant (PDA), portable multimedia player (PMP), moving picture experts group layer-3 (MP3) player, mobile medical device, camera, and wearable device. According to certain embodiments, the wearable device may include at least one of an accessory type device (e.g., watch, ring, bracelet, ankle bracelet, necklace, glasses, contact lens), head-mounted-device (HMD), textile or clothing integral type device (e.g., electronic clothing), body attachment type device (e.g., skin pad or tattoo), and bio implanted type device (e.g., implantable circuit).

In an embodiment, the electronic device may be a home appliance. The home appliance may include at least one of, for example, a television, digital video disk (DVD) player, audio device, refrigerator, air-conditioner, cleaner, oven, microwave oven, washing machine, air cleaner, set-top box, home automation control panel, security control panel, television box (e.g., Samsung HomeSync™, AppleTV™, or Google TV'), game console (e.g., Xbox™, PlayStation™), electronic dictionary, electronic key, camcorder, and electronic frame.

In another embodiment, an electronic device may include at least one of various medical devices (e.g., various portable medical measurement devices (blood sugar measurement device, heartbeat measurement device, blood pressure measurement device, or body temperature measurement device), magnetic resonance angiography (MRA) device, magnetic resonance imaging (MRI) device, computed tomography (CT) device, scanning machine, and ultrasonic wave device), navigation device, global navigation satellite system (GNSS), event data recorder (EDR), flight data recorder (FDR), vehicle infotainment device, ship electronic equipment (e.g., ship navigation device, gyro compass), avionics, security device, vehicle head unit, industrial or home robot, automatic teller's machine (ATM) of a financial institution, point of sales (POS) of a store, and Internet of things (e.g., bulb, various sensors, electricity or gas meter, sprinkler, fire alarm, thermostat, street light, toaster, exercise mechanism, hot water tank, heater, boiler).

According to an embodiment, the electronic device may include at least one of a portion of furniture or a building/structure, electronic board, electronic signature receiving device, projector, and various measurement devices (e.g., water supply, electricity, gas, or electric wave measurement device). In certain embodiments, the electronic device may be a combination of one or more of the foregoing various devices. An electronic device according to an embodiment may be a flexible electronic device. Further, the electronic device according to an embodiment of this document is not limited to the foregoing devices and may include a new electronic device according to technology development.

In this document, the term "user" may indicate a person using an electronic device or a device (e.g., an artificial intelligence electronic device) using an electronic device.

Hereinafter, certain embodiments will be described in detail with reference to the accompanying drawings. However, in the drawings, the size of the components may be exaggerated or reduced for convenience of description. For example, the size and thickness of each component shown in the drawings are arbitrarily shown for convenience of description, and thus the present disclosure is not necessarily limited to the illustrated.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
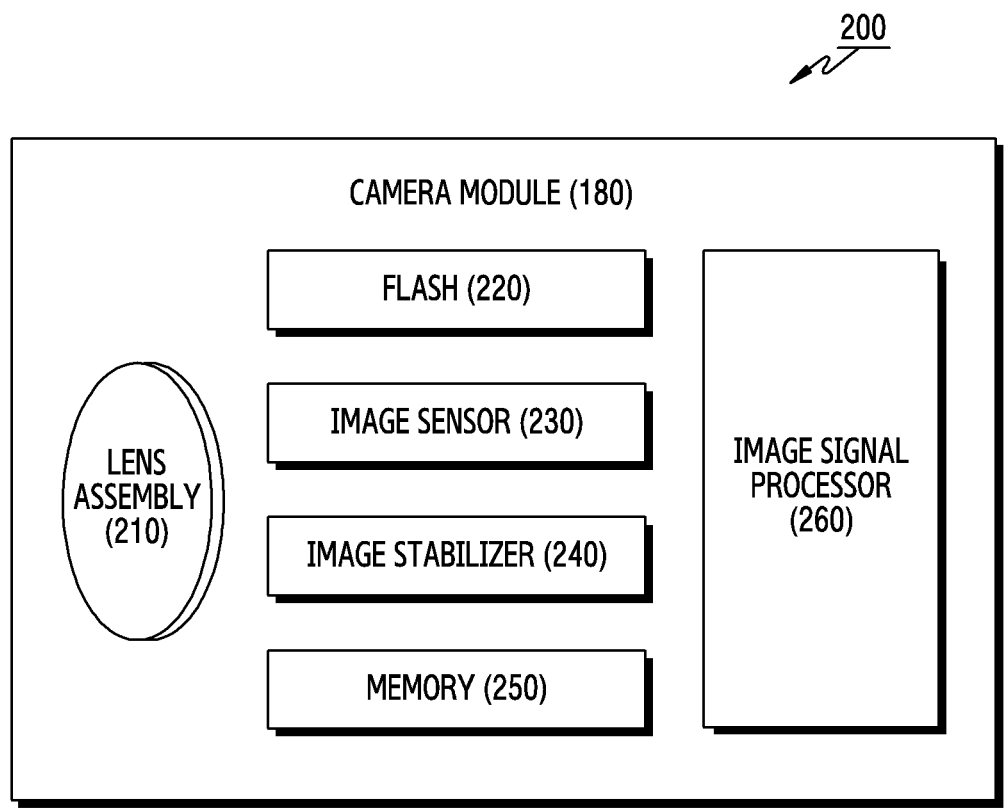
FIG. 2 is a block diagram illustrating a camera module according to certain embodiments.

FIG. 2 is a block diagram 200 illustrating the camera module 180 according to certain embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 3:
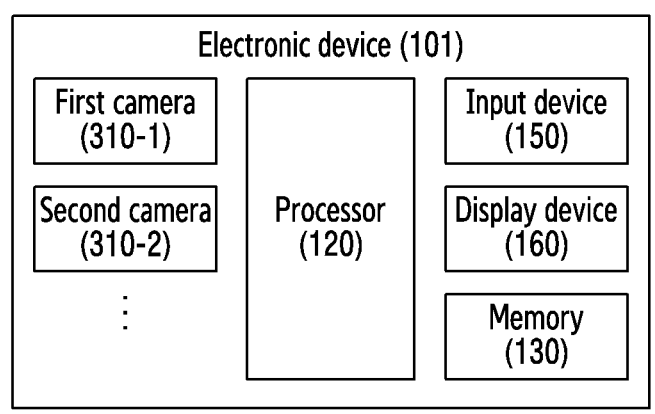
FIG. 3 is a block diagram illustrating an electronic device according to certain embodiments.

FIG. 3 is a block diagram illustrating an electronic device 101 according to certain embodiments. The electronic device 101 of FIG. 3 may correspond to the electronic device 101 of FIG. 1. The electronic device 101 may be a smart phone, a personal digital assistant (PDA), a tablet personal computer (PC) such as a smart pad, a desktop PC, or a laptop PC. According to certain embodiments, the electronic device 101 may be an embedded PC that may be included as part of another electronic device, or may be a wearable device such as a smart watch.

The electronic device 101 may include a processor 120, a memory 130, an input device 150, a display device 160, and a plurality of cameras. Referring to FIG. 3, the electronic device 101 may include a first camera 310-1 and a second camera 310-2. The number of cameras included in the electronic device 101 is not limited to the example of FIG. 3. For example, the electronic device 101 may include three or more cameras. A plurality of cameras included in the processor 120, the memory 130, the input device 150, the display device 160, and the electronic device 101 may be operably and/or electrically coupled with each other via, for example, an electrical interface such as a communication bus.

The processor 120 may execute one or more instructions stored in the memory 130. The processor 120 may include a circuit for processing data, for example, at least one of an integrated circuit (IC), an arithmetic logic unit (ALU), a field programmable gate array (FPGA), and large scale integration (LSI). The number of processors 120 is not limited to the example of FIG. 3. For example, the electronic device 101 may include a plurality of processors 120. The memory 130 may store data related to the electronic device 101. The memory 130 includes a volatile memory, such as a random access memory (RAM) including a static random access memory (SRAM), a dynamic RAM (DRAM), or the like, or may include a nonvolatile memory, such as a flash memory, an embedded multi-media card (eMMC), a solid state drive (SSD) as well as a read only memory (ROM), a magneto resistive RAM (MRAM), a spin-transfer torque MRAM (STT-MRAM), a phase-change RAM (PRAM), a resistive RAM (RRAM), a ferroelectric RAM (FeRAM), or the like.

The memory 130 may store instructions related to an application and instructions related to an operating system (OS). The operating system is system software executed by the processor 120. The processor 120 may manage hardware components included in the electronic device 101 by executing the operating system. The operating system may provide an application programming interface (API) as an application, which is the remaining software except for system software.

One or more applications, which are a set of a plurality of applications, may be installed in the memory 130. If the application is installed in the memory 130, the application is stored in a format executable by the processor 120 connected to the memory 130. For example, a set of instructions, such as a camera application, for controlling the first camera 310-1 and/or the second camera 310-2 included in the electronic device 101, may be installed in the memory 130. The processor 120 may execute the set of instructions to control the first camera 310-1 and/or the second camera 310-2.

The display device 160 may output information to a user, using at least one of an organic light emitting diode (OLED), a liquid crystal display (LCD), and a light emitting diode (LED), in a visible form. In order to more intuitively control a user interface (UI) output through the display device 160, the electronic device 101 may include touch screen panels (TSPs) (not shown) disposed in a display area in which the UI is visualized on the display device 160. The touch screen panels may detect the location of an external object (e.g., a user's finger and a stylus), which touches the display device 160 or is hovering over the display device 160 by using at least one of a resistive film, capacitive components, a surface acoustic wave, and infrared rays.

In an embodiment, the processor 120 may control the first camera 310-1 and/or the second camera 310-2 according to the user's gesture based on the external object. In order for the user to more intuitively control the first camera 310-1 and/or the second camera 310-2, the processor 120 may display, in the display device 160, a preview image that is based on at least a part of an image acquired from the first camera 310-1 and/or the second camera 310-2. For example, the processor 120 may display the preview image in the display device 160, based on one of the first camera 310-1 and the second camera 310-2. The number of cameras used to display the preview image may differ depending on the embodiment. For example, the processor 120 may display the preview image in the display device 160, based on a plurality of images simultaneously acquired from at least two cameras among the plurality of cameras. Based on the preview image and/or movement of the external object in a user interface (UI) in the display including the preview image, the processor 120 may control the first camera 310-1 and/or the second camera 310-2.

In an embodiment, the processor 120 may control the first camera 310-1 and/or the second camera 310-2 based on a command and a user's movement identified through the input device 150. For example, based on the user's voice signal, which is received through a microphone (not shown) included in the input device 150, the processor 120 may control the first camera 310-1 and/or the second camera 310-2. The processor 120 according to an embodiment may control the first camera 310-1 and/or the second camera 310-2 based on the movement of an external object captured by the first camera 310-1 and/or the second camera 310-2. The user's input, which is detected using the input device 150, the display device 160, and/or at least one camera by the processor 120, will be described in detail with reference to FIGS. 6A to 6B, FIGS. 7A to 7B, and FIGS. 8A to 8B.

The electronic device 101 according to certain embodiments may acquire an image file or a video file by photographing a subject existing in an external space using the first camera 310-1 and/or the second camera 310-2. Each of the first camera 310-1 and the second camera 310-2 may be based on the camera module 180 of FIG. 2 or may include at least one hardware component of the camera module 180. For example, each of the first camera 310-1 and the second camera 310-2 may include the lens assembly 210, the image sensor 230, the image stabilizer 240, the memory 250, and/or the image signal processor (ISP) 260, shown in FIG. 2.

The image sensor included in each of the first camera 310-1 and the second camera 310-2 may include pixels arranged in two dimensions. The image sensor may convert an image formed through a lens assembly into an electrical signal in units of pixels based on a photoelectric effect. Each of the pixels may include a plurality of photo diodes (PDs) for converting an optical signal into an electrical signal based on the photoelectric effect.

Each of the first camera 310-1 and the second camera 310-2 may be disposed on at least one of a front surface of the housing of the electronic device 101 (e.g., a surface of a housing in which the display device 160 is viewed) or a rear surface thereof (e.g., the other surface opposite to the front surface of the housing). In an embodiment, if both the first camera 310-1 and the second camera 310-2 are disposed at the rear surface of the housing, both the first camera 310-1 and the second camera 310-2 may output an image based on external light directed to the rear surface.

The images output by the first camera 310-1 and the second camera 310-2 may differ according to a field of view, a focal length, and/or a magnification of each of the first camera 310-1 and the second camera 310-2. The field of view may refer to a camera angle at which an image is captured. The focal length may refer to a distance between a center point and a focal point of a lens (e.g., the lens assembly 210 of FIG. 2) included in the camera. A telephoto lens may be a lens having a relatively long focal length, and a wide-angle lens may be a lens having a relatively short focal length. A standard lens may be a lens having a focal length shorter than the focal length of the telephoto lens and exceeding the focal length of the wide-angle lens. The magnification is a value indicating a degree to which the subject is enlarged in the image and captured, and may be enlarged as the focal length is longer. For example, the telephoto lens may support larger magnifications than the wide-angle lens. The magnification range may be the range of magnifications supported by the camera. In an embodiment, the first camera 310-1 and the second camera 310-2 included in the electronic device 101 include single focus lenses having different respective magnifications, or may include zoom lenses having magnifications changing within a designated magnification range.

If a field of view, a focal length, and/or a magnification range are different for each of the first camera 310-1 and the second camera 310-2, for example, if the first camera 310-1 and the second camera 310-2 include image sensors and/or lens assemblies having different shapes and/or specifications, the first camera 310-1 and the second camera 310-2, which capture the same subject, may output different images. For example, if a field of view of the first camera 310-1 is wider than a field of view of the second camera 310-2, the first camera 310-1 may output an image including external light within a wide field of view including the subject, and the second camera 310-2 may output an image including external light in a relatively narrow field of view including the subject.

A field of view, a focal length, and/or a magnification range may be dependent on each other. For example, if a field of view of the first camera 310-1 is wider than a field of view of the second camera 310-2, the maximum value of a magnification range and/or a focal length of the first camera 310-1 may be smaller than the maximum value of the same of the second camera 310-2. In this case, the first camera 310-1 may be used to photograph a subject located relatively close to the electronic device 101, and the second camera 310-2 may be used to photograph a subject located relatively distant from the electronic device 101. Alternatively, the first camera 310-1 may be used to photograph the entire subject, and the second camera 310-2 may be used to enlarge and photograph a part of the subject. In this case, the first camera 310-1 may include a wide-angle lens, and the second camera 310-2 may include a telephoto lens. The electronic device 101 according to certain embodiments may photograph a subject by controlling at least one of the first camera 310-1 and the second camera 310-2 based on user input.

After the electronic device 101 is turned on, the first camera 310-1 and/or the second camera 310-2 may not be consistently maintained in an activated state. The activated state is a state after the initialization of a camera is completed, and may refer to a state in which the camera is capable of photographing a subject based on a control signal (e.g., a control signal received from the processor 120). In an embodiment, an activated state may refer to a state in which a camera receives power, which is normal power, reference power, or a designated power (voltage or current) or higher, from a battery (e.g., the battery 189 of FIG. 1) via a PMIC. In an embodiment, the activated state may refer to a state in which a camera stores an image, acquired from an image sensor, in a designated area of the memory 130, such as a buffer. For example, the activated state may include a stream ON state in which a stream of images, which is acquired from the image sensor, is stored in the buffer. In an embodiment, the processor 120 may display, as a preview image, at least a portion of the stream of images in the display device 160, so as to display, substantially in real time, to a user an image currently being photographed by the camera.

According to certain embodiments, after booting is completed, states of the first camera 310-1 and the second camera 310-2 may be switched between the activated state and a sleep state. The sleep state may refer to a state in which initialization is not required in order to switch a state of a camera to the activated state but normal power needs to be obtained from the PMIC. In an embodiment, the sleep state may refer to a state in which the camera receives power lower than reference power from the PMIC. In an embodiment, the sleep state may refer to a state in which the camera does not store an image, which is acquired from the image sensor, in a buffer. In an embodiment, the sleep state may include one or more of an inactive state, an idle state, a standby state, a stream OFF state, or a low-power state. In an embodiment, the sleep state may include a power-off state in which power is not received.

In an embodiment, in order to reduce power consumption of the first camera 310-1 and the second camera 310-2, the processor 120 may switch the states of the first camera 310-1 and/or the second camera 310-2 between an activated state and a sleep state. The processor 120 may switch the states of the first camera 310-1 and the second camera 310-2 between the activated state and the sleep state, based on user input for capturing a subject in a state of enlarging and/or reducing the same.

For example, in a state where a subject is captured based on the first camera 310-1, having a wider field of view than the second camera 310-2, the processor 120 may switch the camera that captures a subject from the first camera 310-1 to the second camera 310-2 based on reception of user input for increasing magnification. In order to switch the camera capturing the subject from the first camera 310-1 to the second camera 310-2, the processor 120 may switch the state of the second camera 310-2 from the sleep state to the activated state. In an embodiment, a time point at which the state of the second camera 310-2 is switched from the sleep state to the activated state may be determined based on the user input for increasing the magnification. For example, the state of the second camera 310-2 may be switched by the processor 120 so that the user may not recognize a delay occurring in the case where the state of the second camera 310-2 is switched. Hereinafter, with reference to FIG. 4, an operation of switching the states of the first camera 310-1 and/or the second camera 310 by the electronic device 101 and/or the processor 120 according to certain embodiments will be described in detail.

Figure 4:
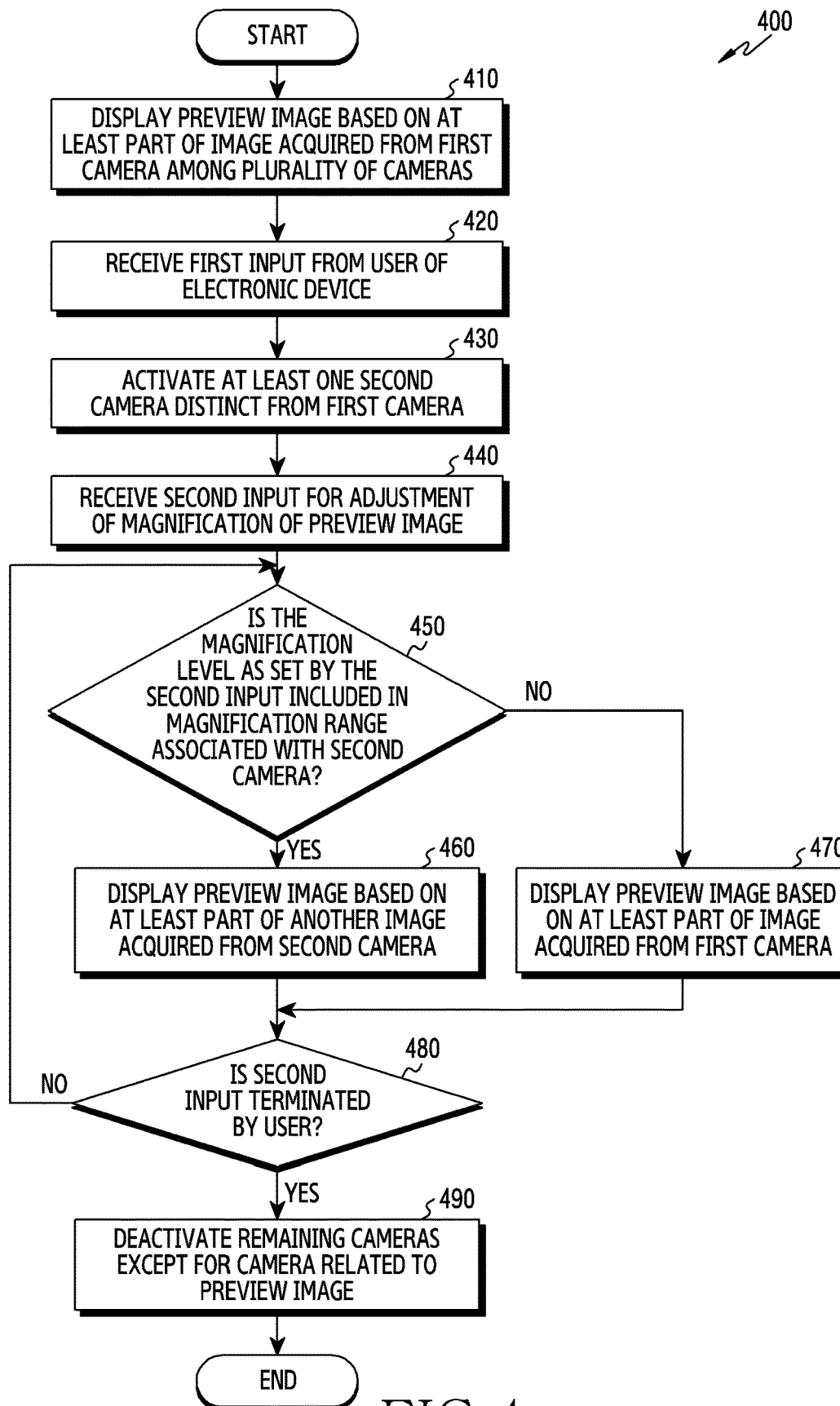
FIG. 4 is a flowchart illustrating the operation of an electronic device according to certain embodiments.

FIG. 4 is a flowchart 400 illustrating an operation of an electronic device according to certain embodiments. The electronic device of FIG. 4 may correspond to the electronic device 101 of FIGS. 1 and 3. For example, the operation of FIG. 4 may be performed by the electronic device 101 and/or the processor 120 of FIG. 3. For example, the operation of FIG. 4 may be performed in response to a user's request to execute an application (e.g., a camera application) related to a camera included in the electronic device, among a plurality of applications installed in the electronic device.

Referring to FIG. 4, in operation 410, an electronic device according to certain embodiments may display a preview image, which may be at least partially based on an image acquired from a first camera among a plurality of cameras. As described with reference to FIG. 3, the electronic device may include a plurality of cameras, and the first camera may correspond to any one (for example, the first camera 310-1 or the second camera 310-2 of FIG. 3) of the plurality of cameras. The preview image is based on the image output from the image sensor of the first camera, and may have the same resolution as that of the output image, or may have a smaller resolution than that of the output image.

In an embodiment, the first camera may correspond to a camera designated by an application running in an electronic device among a plurality of cameras. For example, the first camera may correspond to a camera that is designated to be activated first according to the configuration of the application. According to an embodiment, the electronic device may turn on the first camera among a plurality of cameras, or may switch the state of the first camera to an activated state. For example, the electronic device may transmit, to the first camera having been switched into the activated state, a command (for example, direct memory access (DMA) ON) which includes an address of a buffer in a memory (e.g., the memory 130 of FIGS. 1 and/or 3) designated to store an image and utilizes an image acquired by the first camera to be stored in the buffer. The buffer may be a part of a memory in which a plurality of images (e.g., images corresponding to eight frames continuously photographed by the first camera) are stored based on a queue method.

In response to reception of the command, the image, acquired from the image sensor of the first camera, may be stored in at least a part of the memory corresponding to the address. According to an embodiment, the electronic device may display at least a part of the image, stored in the buffer, as a preview image in the display. For example, the electronic device may display the image without change or may display a compressed image having a resolution lower than the actual resolution of the image. In an embodiment, the electronic device may display, together with the preview image, one or more visual elements (e.g., buttons, icons, text boxes, progress bars) for controlling at least one of the plurality of cameras. A UI is displayed in a display by an electronic device and includes the preview image and the one or more visual elements, and an example of the UI will be described in detail with reference to FIGS. 5A to 5C.

Referring to FIG. 4, in operation 420, an electronic device according to certain embodiments may receive a first input from a user of the electronic device. In an embodiment, in the state where the preview image is displayed in a display based on operation 410, the electronic device may receive a first designated input from the user. In an embodiment, the first input may refer to an input received before a second input for adjustment of the magnification of the preview image. In an embodiment, the first input may be an input defined to be received before the second input. For example, the first input may correspond to a user's action that needs to be received prior to receiving the second input. For example, if the second input is a touch gesture, such as a pinch-to-zoom performed on the display, the first input may include the user's action of touching at least two fingers on the display in order to perform the pinch-to-zoom gesture. For example, if the second input is the user's voice command (e.g., "zoom in, please" or "zoom out, please") for adjustment of the magnification, the first input may include a wake-up command (e.g., "Hey Bixby") that the user speaks prior to the voice command in order to notify the electronic device of user utterance of the voice command. For example, if the second input is a gesture of pressing a physical button to adjust the magnification, the first input may include a gesture of pushing the physical button by using a pressure (e.g., a pressure below a threshold pressure at which the physical button is pressed) designated on the physical button. For example, if the second input is a touch gesture, which drags a visual element, such as a progress bar (e.g., a zoom bar) displayed within the display, in order to adjust the magnification, the first input may include a user's gesture which is performed to display the visual element. For example, if the progress bar is displayed in a display, the first input may include a gesture of touching a point in the progress bar to drag the point. Various examples of the first input and the second input, performed by the user, will be described in detail with reference to FIGS. 6A to 6B, 7A to 7B, and/or 8A to 8B.

Referring to FIG. 4, in operation 430, the electronic device according to certain embodiments may activate at least one second camera distinct from the first camera. In an embodiment, in response to reception of the first input, the electronic device may activate at least one second camera that is distinct from the first camera operating to display the preview image. The number of the at least one second camera, activated among the plurality of cameras, may be at least partially based on the first input and/or the magnification and/or magnification range of the first camera. For example, the electronic device may activate at least one second camera supporting a magnification that is not included in the magnification range of the first camera, operating to display the preview image, among the plurality of cameras. For example, the electronic device may activate at least one second camera having a single focus lens, which has a magnification distinct from that of a single focus lens included in the first camera, among the plurality of cameras.

Referring to FIG. 3, if the electronic device 101 receives the first input in a state where the electronic device 101 has activated the first camera 310-1, the electronic device 101 may activate the second camera 310-2, distinct from the first camera 310-1. Similarly, if the electronic device 101 receives the first input in a state where the second camera 310-2 is activated, the electronic device 101 may activate the first camera 310-1 distinct from the second camera 310-2.

Since, in response to reception of the first input, the electronic device activates at least one second camera, the at least one second camera may be switched from a power-off state and/or a sleep state to an activate state prior to reception of the second input, which is performed to adjust a magnification. In an embodiment, the electronic device may transmit, to at least one second camera, a command (for example, direct memory access (DMA) ON) which includes an address of a buffer in a memory (e.g., the memory 130 of FIGS. 1 and/or 3) designated to store an image and utilize an image acquired by the at least one second camera to be stored in the buffer. In an embodiment, the buffer may be distinct from a buffer included in the command stored in the first camera in order to activate the first camera. The buffer may be a part of a memory in which a plurality of images (e.g., images corresponding to eight frames continuously photographed by the second camera) are stored based on a queue method.

In the state where the at least one second camera is activated based on operation 430, the processor of the electronic device may receive a plurality of images acquired from the first camera and the at least one second camera, respectively. For example, an image acquired from the first camera may be stored in a first buffer designated in the memory, and at least one image acquired from the at least one second camera may be stored in a second buffer designated in the memory. Even after activating the at least one second camera based on operation 430, the electronic device may maintain, based on operation 410, displaying of a preview image, which is based on at least a part of the image acquired from the first camera.

Referring to FIG. 4, in operation 440, the electronic device according to certain embodiments may receive a second input adjusting a magnification level of the preview image. At least one second camera, which is distinct from the first camera used to display the preview image and has a magnification that is not supported by the first camera, may be activated prior to reception of the second input based on operation 430. For example, the second input may include a pinch-to-zoom gesture for enlarging or reducing the preview image. For example, the second input may include a user's touch gesture, which is performed on a visual element, such a zoom bar, for adjusting a magnification. For example, the second input may include a user's voice command for adjusting the magnification. In response to reception of the second input, the electronic device may adjust the magnification of the preview image displayed in the display, based on the second input. The adjustment of the magnification of the preview image may be performed at least partially based on digital zoom. The adjustment of the magnification may be performed by controlling the first camera and/or the second camera, which correspond to the preview image, according to a second input.

Referring to FIG. 4, in operation 450, an electronic device according to certain embodiments may determine whether the adjusted magnification level (e.g., as set by the second input) is included in a magnification range of the second camera. The magnification range may be based on at least one of a magnification range supported by the second camera or a magnification range supported by the first camera. According to an embodiment, the electronic device may determine whether the magnification adjusted by the second input falls within a magnification range that is not supported by the first camera. For example, the electronic device may determine whether the magnification adjusted by the second input is included within a magnification range, which is supported by the at least one second camera, and is not included in a magnification range supported by the first camera.

If the adjusted magnification level is not included within the magnification range associated with the second camera (indicated by "No" in reference numeral 450), then in operation 470, the electronic device according to certain embodiments may display a preview image based on at least a part of an image acquired from the first camera (e.g., capture and display using the first camera is maintained). For example, in a state where the magnification adjusted by the second input is included within a magnification range supported by the first camera, the electronic device may maintain display of the preview image, based on at least a part of an image acquired from the first camera. In an embodiment, the electronic device may control the first camera based on the second input to display the preview image, which is based on a magnification adjusted according to the second input.

If the adjusted magnification level is included within a magnification range associated with the second camera (i.e., indicated by "Yes" in reference numeral 450), then in operation 460, the electronic device according to certain embodiments may display a preview image based on at least a part of another image acquired from the second camera. That is, image-capture for generating the preview image is changed from the first camera to the second camera. For example, if the magnification adjusted by the second input is not included in a magnification range supported by the first camera, the electronic device may change the camera that is used to display a preview image from the first camera to the second camera. In a state where the preview image is displayed based on at least a part of another image acquired from the second camera, the electronic device may terminate the display of the preview image, based on at least a part of the image acquired from the first camera.

In an embodiment, the electronic device may switch, based on operation 460, the camera used to display the preview image from the first camera used in operation 410 to the at least one second camera activated based on operation 430. Since the at least one second camera is activated before magnification of the preview image is adjusted by the second input, the electronic device may seamlessly perform switching between the first camera and the second camera according to adjustment of a magnification, in operation 460.

Referring to FIG. 4, in operation 480, the electronic device according to certain embodiments may determine whether the second input is terminated by the user. For example, if the second input is a touch gesture, such as a pinch-to-zoom performed on a display, the electronic device may identify ceasing of the second input in response to detection that at least two fingers performing the touch gesture have been lifted from the display. For example, if the second input is a touch gesture of dragging a visual element as a zoom bar, the electronic device identifies ceasing of the second input in response to detection that the fingers performing the touch gesture are lifted from the display. For example, if the second input is a touch gesture of dragging a visual element, such as a zoom bar, and the movement at the point at which the display is dragged is terminated for a designated time or more, the electronic device may determine that the second input is terminated. For example, if the second input is a user's voice command for adjusting the magnification, and an additional voice command is not made for a predetermined time after the voice command is uttered, the electronic device may identify ceasing of the second input.

If the second input is not terminated by a user (indicated by "No" in reference numeral 480), an electronic device according to certain embodiments may, based on at least one of operations 450, 460, 470 of FIG. 4, continuously perform an operation of adjusting the magnification of the preview image based on the second input and/or switching the camera by adjusting the magnification. For example, after the electronic device switches the camera used to display the preview image from the first camera to the second camera based on operation 460, if it is determined that the magnification adjusted by the second input is not included within a magnification range associated with the second camera (e.g., if a magnification enters a magnification range associated with the first camera and is out of a magnification range associated with the second camera), then the electronic device may switch the camera used to display the preview image from the second camera back to the first camera, based on operation 470.

If the second input is terminated by a user (indicated by "Yes" in reference numeral 480), then in operation 490, an electronic device according to certain embodiments may deactivate the remaining cameras, except for the camera presently being used to capture the preview image. For example, if the electronic device displays the preview image based on an image acquired from the second camera based on operation 460, the electronic device may deactivate the first camera based on operation 490. For example, if the electronic device displays the preview image based on an image acquired from the first camera based on the operation 470, the electronic device may deactivate the at least one second camera, which is activated in operation 430, based on operation 490.

In an embodiment, deactivation of the remaining cameras except for a camera associated with the preview image may be performed based on a command transmitted by the processor of the electronic device to the remaining cameras, and/or a control signal including the command. For example, the command may include a command of switching the state of the camera to a sleep state. For example, the command may include a command (e.g., DMA OFF) of ceasing storing of the image, acquired by the camera, in a buffer in a memory.

Referring to FIG. 4, another camera (e.g., at least one second camera), which is distinct from the camera (e.g., a first camera) activated to display a preview image, may be activated by a first input that needs to be performed before the second input for adjustment of magnification, and may be deactivated by the ceasing of the second input. In an embodiment, the number of activated cameras among the plurality of cameras included in the electronic device may be two or more in a time interval from the time point at which the first input is received to the time point at which the second input is terminated. Further, the number of activated cameras among the plurality of cameras included in the electronic device may be one in remaining time points other than the time interval.

Figure 5A:
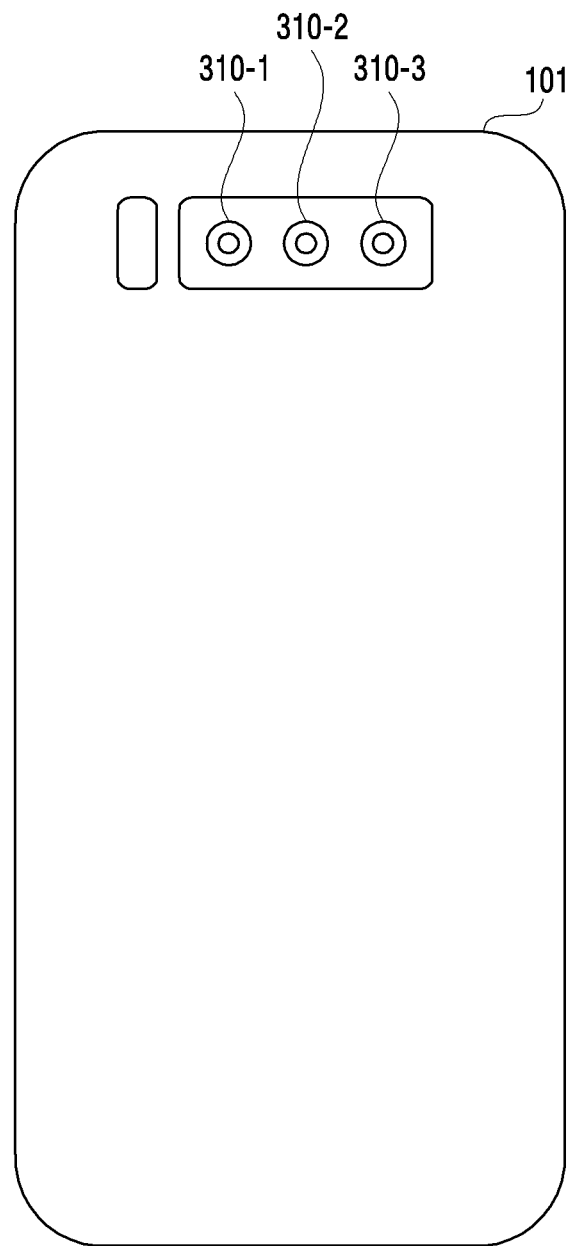
FIG. 5A is an example diagram illustrating an operation, performed by an electronic device, based on a plurality of cameras, according to certain embodiments.
Figure 5B:
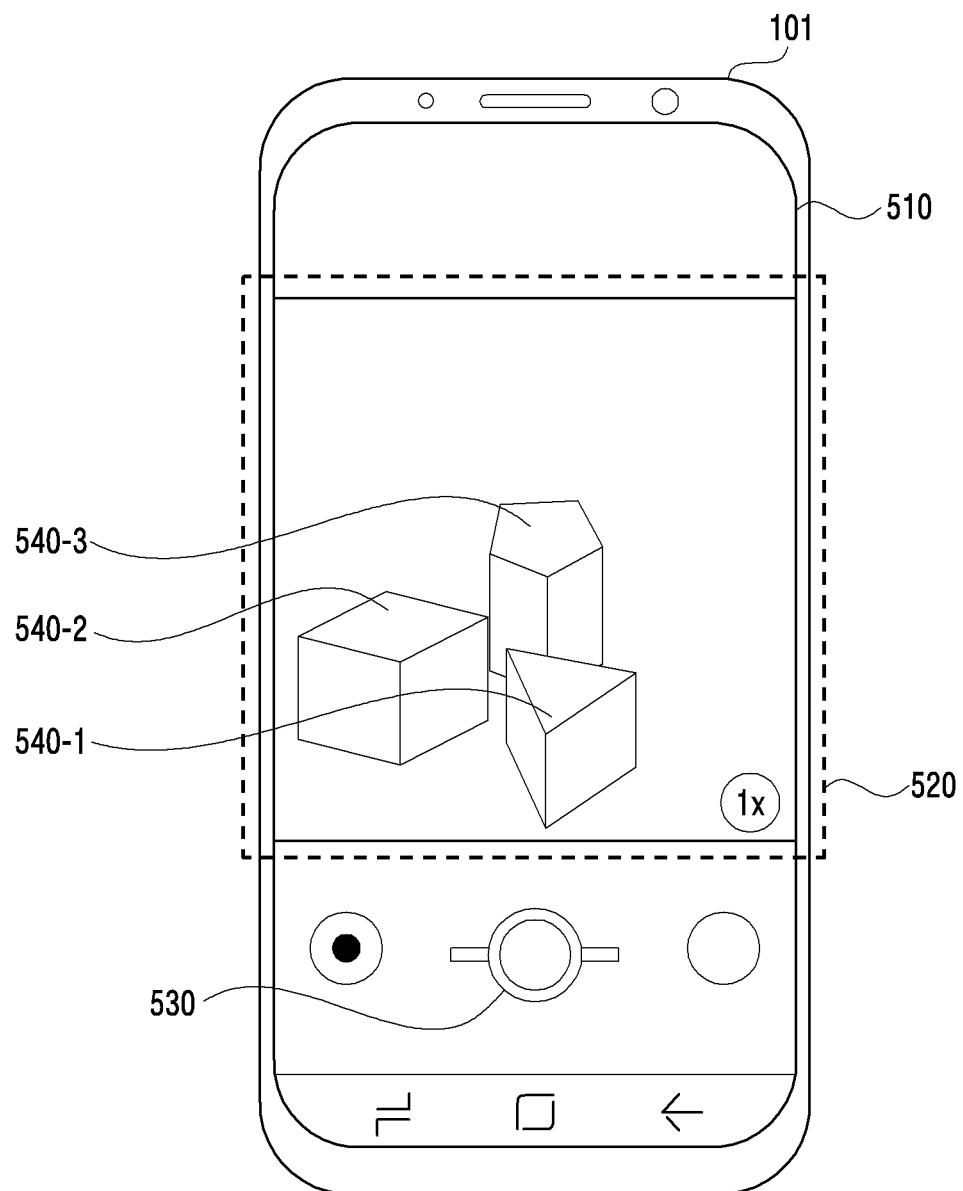
FIG. 5B is an example diagram illustrating an operation, performed by an electronic device, based on a plurality of cameras, according to certain embodiments.
Figure 5C:
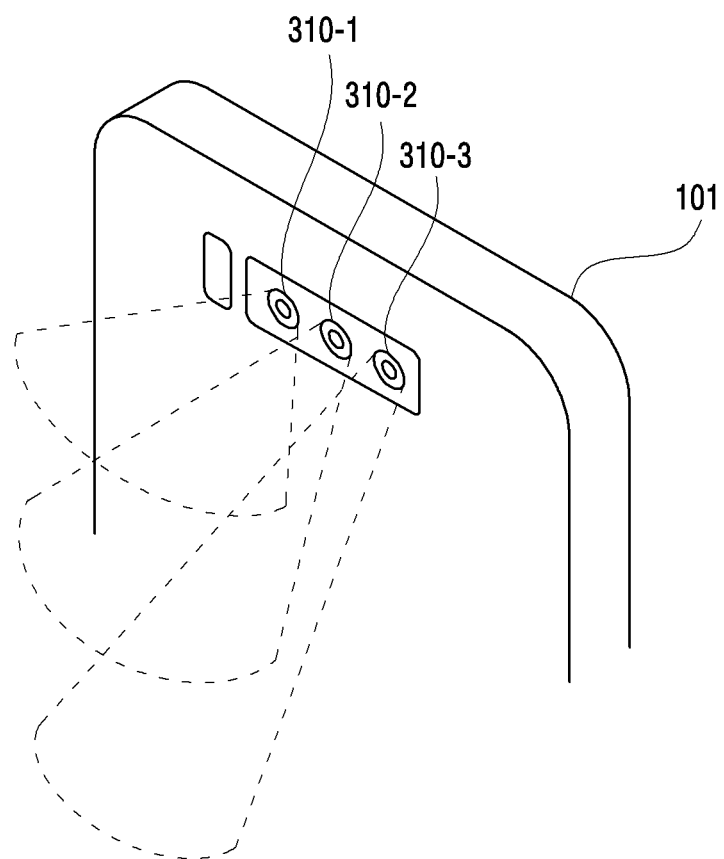
FIG. 5C is an example diagram illustrating an operation, performed by an electronic device, based on a plurality of cameras, according to certain embodiments.

FIG. 5A is an example diagram illustrating an operation, performed by an electronic device 101, based on a plurality of cameras 310-1, 310-2, and 310-3 according to certain embodiments, FIG. 5B is an example diagram illustrating an operation, performed by an electronic device 101, based on a plurality of cameras 310-1, 310-2, and 310-3 according to certain embodiments, and FIG. 5C is an example diagram illustrating an operation, performed by an electronic device 101, based on a plurality of cameras 310-1, 310-2, and 310-3 according to certain embodiments. The electronic device 101 and/or hardware components in the electronic device 101 of FIGS. 5A to 5C may correspond to the electronic device 101 and/or hardware components in the electronic device 101 of FIGS. 1 to 3. For example, the electronic device 101 of FIGS. 5A to 5C may perform at least one of operations of FIG. 4.

Referring to FIG. 5A, a plurality of cameras 310-1, 310-2, and 310-3 are disposed on the rear surface of a housing of the electronic device 101. The number of cameras included in the electronic device 101 is not limited to those shown in FIGS. 5A to 5C. For example, two to four cameras may be disposed on the rear surface of the electronic device 101, and at least one camera may be disposed on the front surface thereof.

A different field of view and/or a focal length may be possessed by each of the plurality of cameras 310-1, 310-2, and 310-3. Referring to FIG. 5C, respective fields of view of the plurality of cameras 310-1, 310-2, and 310-3 are shown. For example, the first camera 310-1 may have the widest field of view and the shortest focal length, based on the wide-angle lens, among the plurality of cameras 310-1, 310-2, and 310-3. For example, the second camera 310-2 may have a narrower field of view than the first camera 310-1 and a longer focal length than the first camera 310-1, based on a standard lens. For example, the third camera 310-3 may have the narrowest field of view and the longest focal length, based on the telephoto lens, among the plurality of cameras 310-1, 310-2, and 310-3.

If the user generates a request for execution of a camera application by the electronic device 101, the electronic device 101 according to an embodiment may activate one of the plurality of cameras 310-1 310-2, and 310-3 (e.g., based on operation 410 of FIG. 4). The electronic device 101 may display a preview image, which is based on at least a part of an image acquired from the activated camera. According to an embodiment, the electronic device 101 may display the preview image in a UI for controlling at least one of the plurality of cameras 310-1, 310-2, and 310-3. After displaying the UI, the electronic device 101 may perform the remaining operations after operation 410 of FIG. 4.

Referring to FIG. 5B, an example, in which a UI is displayed in a display 510 by the electronic device 101 according to an embodiment, is illustrated. The display 510 may be related to, for example, the display device 160 of FIG. 3. The display 510 may be exposed to the outside through the front surface opposite the rear surface, on which the plurality of cameras 310-1, 310-2, and 310-3 are disposed, in the electronic device 101. The electronic device 101 according to an embodiment may display, within at least a portion of the display 510, a preview image 520 based on at least a part of an image acquired from a camera, which is in an activated state, among the plurality of cameras 310-1, 310-2, and 310-3.

The electronic device 101 according to an embodiment may display, in at least a portion of the display 510, a visual element 530 (e.g., a shutter-shaped icon) that is selectable for capturing an image using at least one of the plurality of cameras 310-1, 310-2, and 310-3 (e.g., a camera, which is in an activated state, used to display the preview image 520). The visual element 530 may be superimposed on at least a portion of the display 510 on which the preview image 520 is displayed, and may be displayed. In response to user input selecting the visual element 530 (e.g., touching, in the case of a touch-enabled display), the electronic device 101 may cause a camera presently activated to generate the preview image 520 (e.g., from among the plurality of cameras 310-1, 310-2, and 310-3) to capture at least one image.

FIG. 5B illustrates an example situation in which the electronic device 101 displays a preview image 520 including a plurality of subjects (for example, a triangular prism, a rectangular prism, and a pentagonal prism), which are distally located from the electronic device 101 by different respective distances. If a field of view and/or a focal length are different for each of the plurality of cameras 310-1, 310-2, and 310-3, the number of subjects included in the preview image 520 (or in focus in the preview image 520) may differ according to which camera among the plurality of cameras 310-1, 310-2, or 310-3 has been activated to display the preview image 520.

If the electronic device 101 displays the preview image 520 based on at least a part of an image acquired from the first camera 310-1, since the first camera 310-1 has the widest angle, the number of subjects displayed in the image 520 may be the greatest. Referring to FIG. 5B, if the electronic device 101 displays the preview image 520 using the first camera 310-1, the preview image 520 displayed by the electronic device 101 may include all of a part 540-1 of an image corresponding to a triangular prism, a part 540-2 of an image corresponding to a rectangular prism, and a part 540-3 of an image corresponding to a pentagonal prism.

If the camera used to display the preview image 520 is gradually changed from the first camera 310-1 to the third camera 310-3, the number of subjects displayed in the preview image 520 may be gradually decreased. For example, if the camera used to display the preview image 520 is gradually changed from the first camera 310-1 to the third camera 310-3, the part 540-3 of the image corresponding to the pentagonal prism, which is closest to the center of the preview image 520, is gradually enlarged, and the parts 540-1 and 540-2 of images corresponding to triangular and rectangular prisms may move away from the center of the preview image 520 or disappear.

The electronic device 101 according to certain embodiments may selectively activate the plurality of cameras 310-1, 310-2, and 310-3 according to a magnification, thereby preventing image quality from being degraded due to digital zoom. For example, if a user increases the magnification of the preview image 520 by a designated threshold or more, the electronic device 101 may activate the third camera 310-3, which is based on a telephoto lens supporting the largest magnification, among the plurality of cameras 310-1, 310-2, and 310-3. In a state where the preview image 520 is displayed based on the third camera 310-3, if the user reduces the magnification of the preview image 520, the electronic device 101 may activate the first camera 310-1, which is based on a wide-angle lens supporting the smallest magnification, and/or the second camera 310-2, which is based on a standard lens, among the plurality of cameras 310-1, 310-2, and 310-3.

According to certain embodiments, the time point at which the electronic device 101 activates at least one of the plurality of cameras 310-1, 310-2, and 310-3 may be a time point before reception of input for magnification adjustment. In this case, the electronic device 101 may continuously perform camera switching corresponding to the preview image 520, based on the magnification adjusted by the user. As the camera switching is continuously performed, a delay due to the camera switching corresponding to the preview image 520 may be reduced.

Figure 6A:
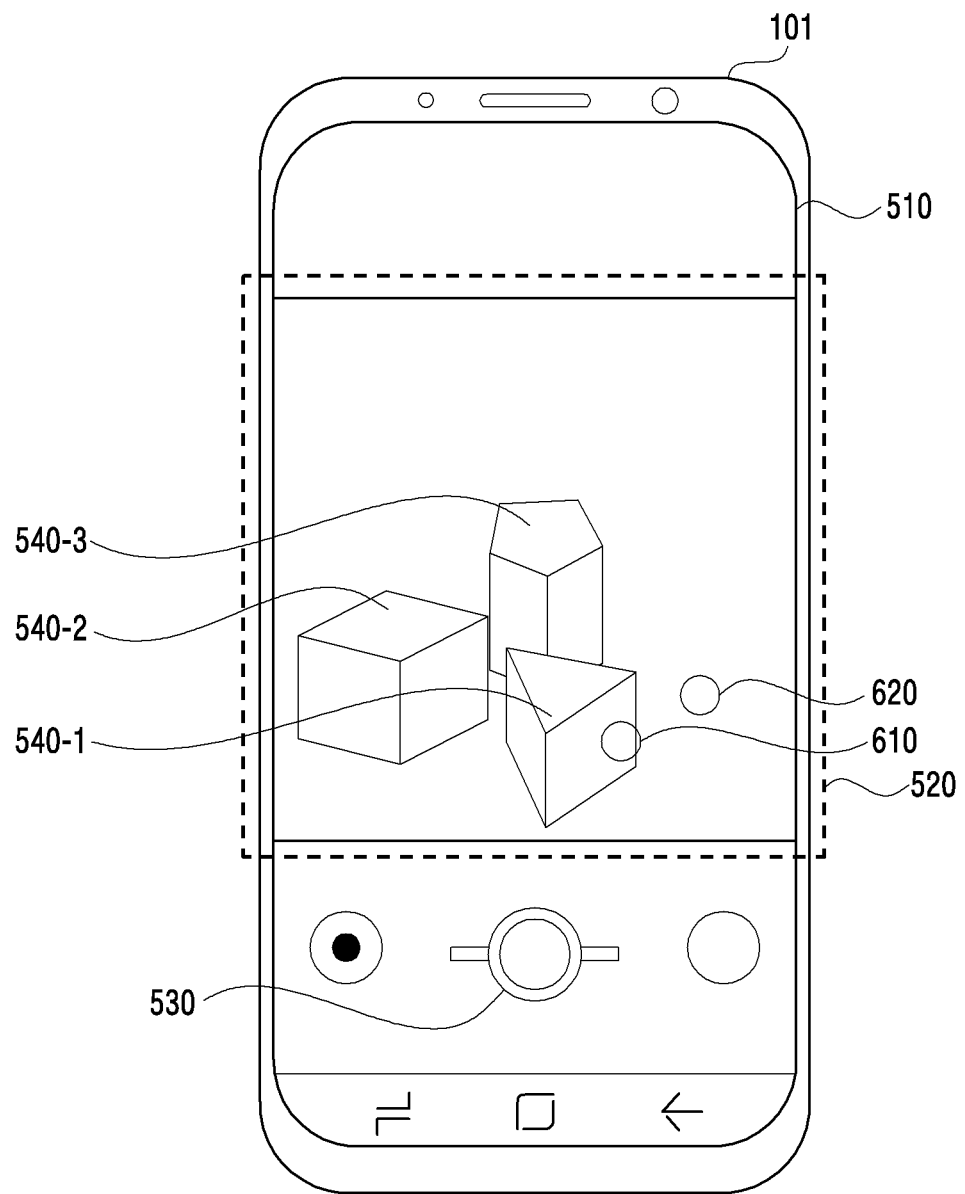
FIG. 6A is an example diagram illustrating an operation of adjusting the magnification of at least one camera among a plurality of cameras, based on an example of a gesture performed on a display, by an electronic device according to an embodiment.
Figure 6B:
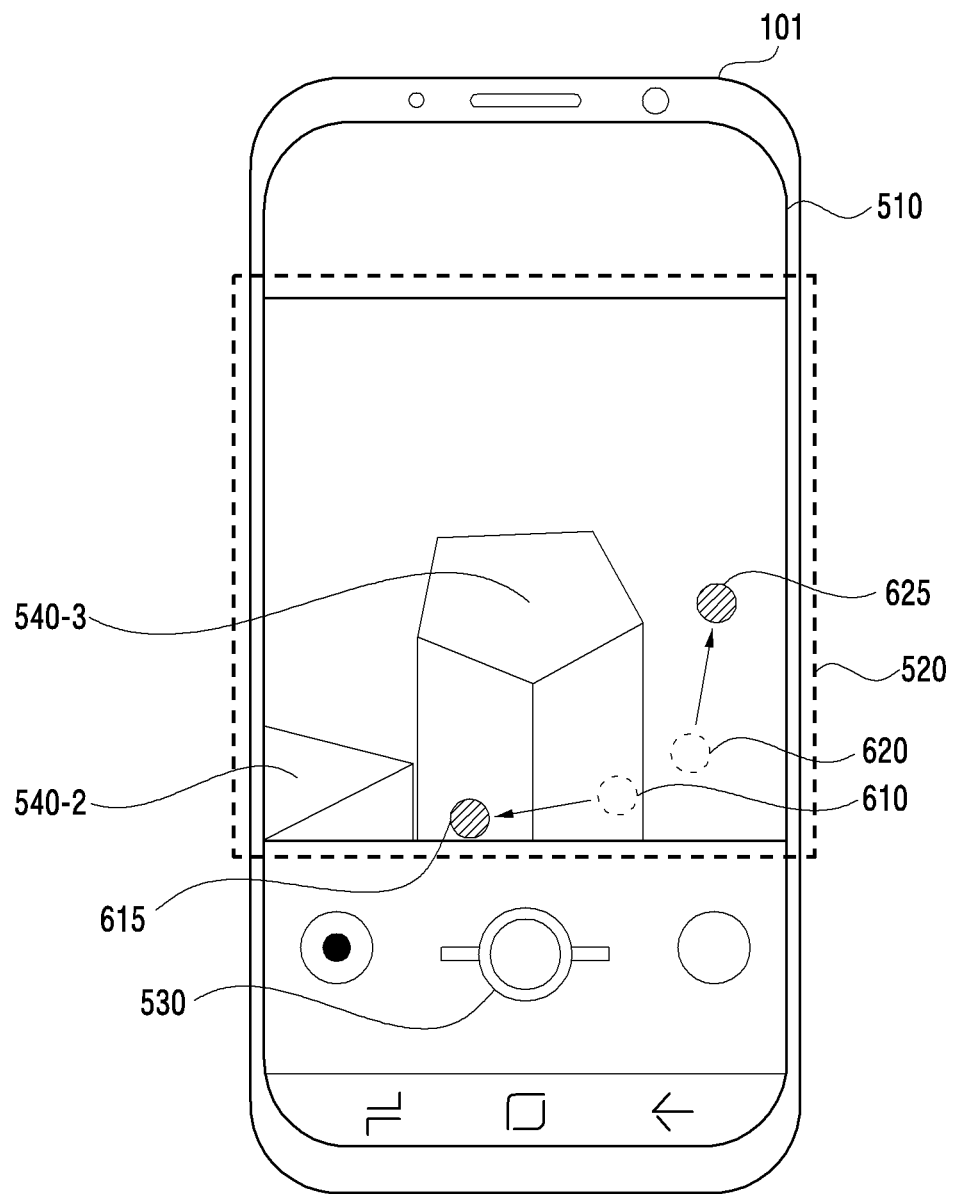
FIG. 6B is an example diagram illustrating an operation of adjusting the magnification of at least one camera among a plurality of cameras, based on an example of a gesture performed on a display, by an electronic device according to an embodiment.

FIG. 6A is an example diagram illustrating an operation of adjusting the magnification of at least one camera among a plurality of cameras, based on an example of a gesture performed on a display 510, by an electronic device 101 according to an embodiment, and FIG. 6B is an example diagram illustrating an operation of adjusting the magnification of at least one camera among a plurality of cameras, based on an example of a gesture performed on a display 510, by an electronic device 101 according to an embodiment. The electronic device 101 of FIGS. 6A to 6B may correspond to the electronic device 101 of FIGS. 1, 3, 5A, and 5B. For example, the electronic device 101 of FIGS. 6A to 6B may perform at least one of operations of FIG. 4.

The electronic device 101 according to certain embodiments may adjust the magnification of the preview image 520 based on a drag gesture detected on the display 510. The electronic device 101 may activate the remaining cameras except for the camera corresponding to the preview image 520 from among the plurality of cameras of the electronic device 101, in response to reception of a first input, which is defined as needing to be received before the drag gesture is received. The second input is an input after the first input is performed, and may include the drag gesture.

The electronic device 101 according to an embodiment may change the magnification of the preview image 520 based on a drag gesture (e.g., a pinch-to-zoom gesture), which is based on at least two fingers touching the display 510. Referring to FIG. 6A, an example of two finger points or contact locations 610 and 620 touching the display 510 is shown. The contacts 610 and 620 (e.g., the points and contact locations for the touch input) may be included in at least a portion of the display 510 in which the preview image 520 is displayed. The time point at which the electronic device 101 activates at least one of the remaining cameras except for the camera associated with the preview image 520, among the plurality of cameras, may correspond to the time point at which at least two external objects touching the display 510, such as two fingers touching the contacts 610 and 620, are detected. In this case, the first input is another touch gesture, defined as needing to be received before a drag gesture included in the second input is performed, and may include a touch gesture for substantially simultaneously touching at least two fingers on the display 510 in order to perform the drag gesture included in the second input.

After the user touches the contacts 610 and 620 on the display 510, the user may drag at least one of fingers touching the contacts 610 and 620. Referring to FIG. 6B, the user may drag a first finger touching the point 610 from the point 610 to the point 615. While dragging the first finger, the user may drag a second finger touching the point 620 from the point 620 to point 625. In this case, the second input may include a drag gesture that adjusts the distance between the plurality of fingers touching the display 510 without lifting the plurality of fingers from the display 510 (e.g., a pinch-out gesture).

In response to identifying that the distance between the fingers touching the display 510 has changed, the electronic device 101 may change the magnification of the preview image 520 according to the changed distance between the fingers. For example, if the distance between fingers touching the display 510 is gradually reduced (e.g., a pinch-in gesture requesting a zoom-out function), the electronic device 101 may gradually reduce the magnification of the preview image 520.

For example, if the distance between the fingers gradually increases (e.g., a pinch-out gesture requesting a zoom-in function) as illustrated in FIG. 6B, the electronic device 101 may gradually increase the magnification of the preview image 520. The increase in the magnification of the preview image 520 is performed by controlling the camera used to display the preview image 520, based on the distance, or by digitally enlarging the preview image 520 based on the image acquired from the camera.

If the magnification is increased beyond a designated threshold, the electronic device 101 may switch the camera used to display the preview image 520, for example, based on operations 450 and 460 of FIG. 4. For example, in a state in which the electronic device 101 displays the preview image 520 based on the first camera including the wide-angle lens, if a user performs a pinch-to-zoom gesture, illustrated in FIGS. 6A to 6B, in order to increase a magnification, the electronic device 101 may switch the camera used to display the preview image 520 from the first camera to a second camera including a standard lens or to a third camera including a telephoto lens. The threshold of magnification used for switching the plurality of cameras may be configured based on a magnification and/or a focal length supported by each of the plurality of cameras included in the electronic device 101.

If the user performs the pinch-to-zoom gesture shown in FIG. 6B and then fingers touching the contacts 615 and 625 are lifted from the display 510, the electronic device 101 may deactivate the remaining cameras except for a camera corresponding to the preview image 520 from among a plurality of activated cameras. For example, after the camera, used to display the preview image 520, has been switched from the first camera to the third camera by a second input, the electronic device 101 may deactivate the remaining cameras except for the third camera in response to identifying that the external objects touching the contacts 615 and 625 are lifted from the display 510. Deactivation of at least one camera from among the plurality of cameras by the electronic device 101 may be performed based on, for example, operations 480 and 490 of FIG. 4.

Since, in response to the first input, which is received before the second input for magnification adjustment, the electronic device 101 according to certain embodiments activates the remaining cameras except for the camera corresponding to the preview image 520, a delay according to camera activation may not occur in the case where the camera for displaying the preview image 520 is switched by the second input. For example, the delay occurring in the case where the camera for displaying the preview image 520 is switched can be reduced. The electronic device 101 according to an embodiment may switch a camera based on the first input and the second input, which have different forms from the first input and the second input, shown in FIGS. 6A to 6B.

Figure 7A:
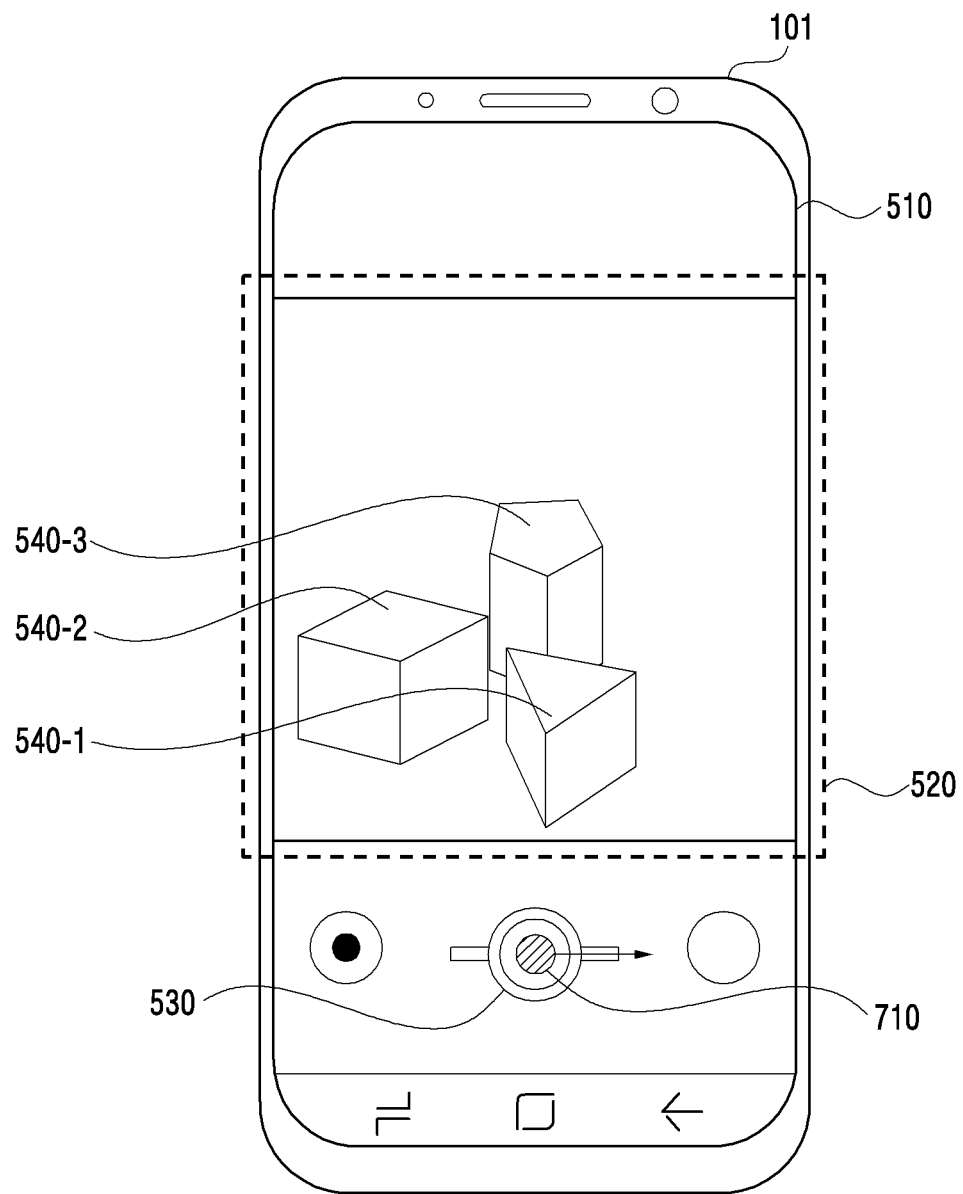
FIG. 7A is an example diagram illustrating an operation of adjusting the magnification of at least one camera among a plurality of cameras, based on another example of a gesture performed on a display, by an electronic device according to an embodiment.
Figure 7B:
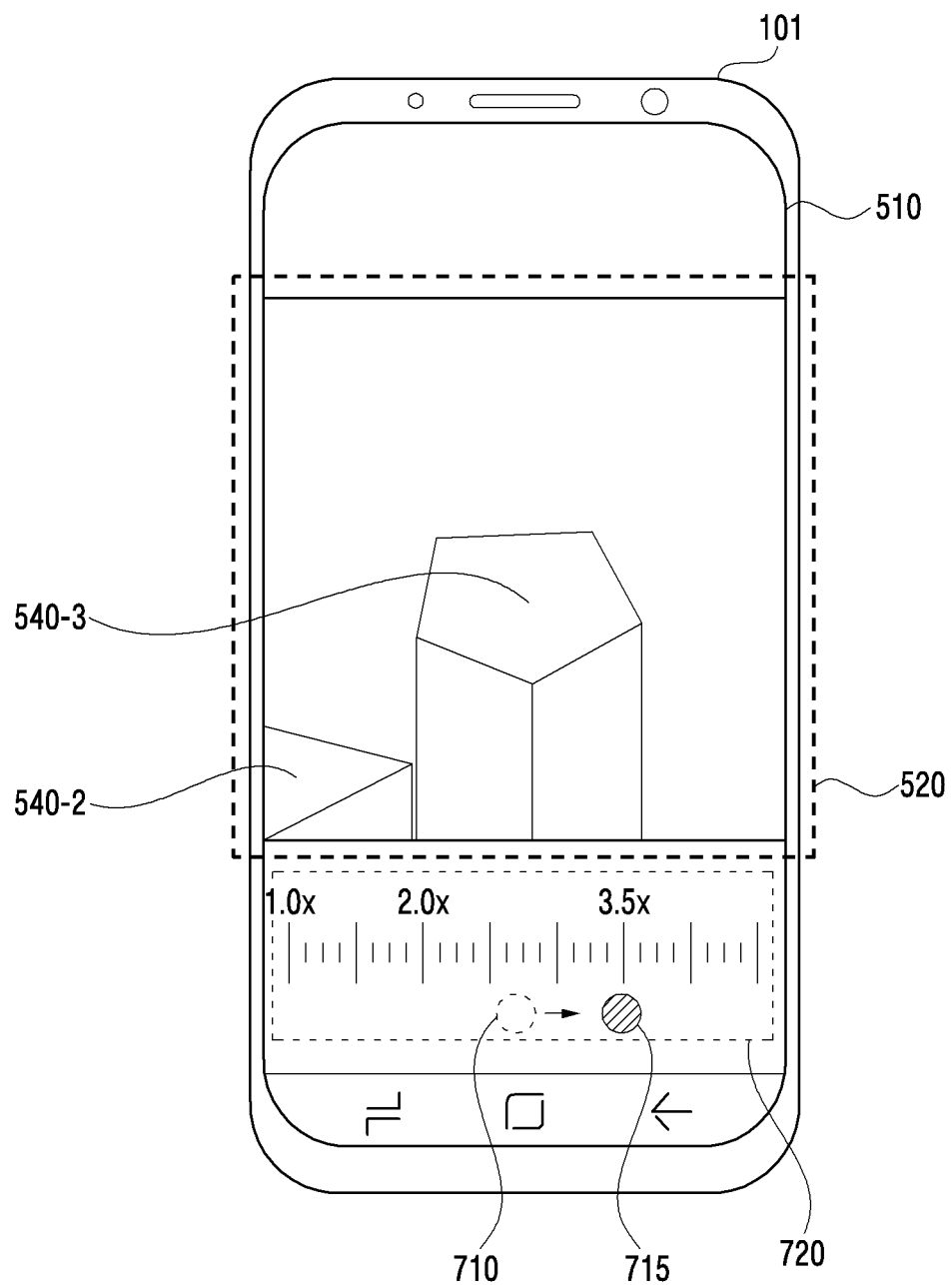
FIG. 7B is an example diagram illustrating an operation of adjusting the magnification of at least one camera among a plurality of cameras, based on another example of a gesture performed on a display, by an electronic device according to an embodiment.

FIG. 7A is an example diagram illustrating an operation of adjusting the magnification of at least one camera among a plurality of cameras based on another example of a gesture performed on a display 510 by an electronic device 101 according to an embodiment, and FIG. 7B is an example diagram illustrating an operation of adjusting the magnification of at least one camera among a plurality of cameras based on another example of a gesture performed on a display 510 by an electronic device 101 according to an embodiment. The electronic device 101 of FIGS. 7A to 7B may correspond to the electronic device 101 of FIGS. 1, 3, 5A, 5B, 6A, and 6B. For example, the electronic device 101 of FIGS. 7A to 7B may perform at least one of operations of FIG. 4.

According to an embodiment, the electronic device 101 may adjust the magnification of the preview image 520 based on a user's touch gesture and/or drag gesture performed along a designated axis. The electronic device 101 may display the axis in the display 510 using a visual element such as a progress bar. The second input for magnification adjustment may include a user's touch gesture and/or drag gesture performed in the designated axis.

The first input, which is performed before the second input, may include gestures and/or actions that need to be received before the second input. Referring to FIG. 7A, after the camera application is executed and before receiving any input from the user, the electronic device 101 may not display any visual element used for magnification adjustment. In this case, the first input may include a user's designated action (e.g., a gesture of pressing a designated physical button, a touch gesture performed on the display 510, and/or a designated voice command) indicating to display the visual element used for magnification adjustment.

Referring to FIG. 7A, the first input may be a drag gesture starting at a portion 710 on a visual element 530, which corresponds to a shutter-shaped icon. For example, if an external object (e.g., a user's finger), which contacts a portion 710 within the visual element 530, is dragged in a direction deviating from a portion of the display 510 where the visual element 530 is displayed (e.g., the horizontal direction of FIG. 7A), the electronic device 101 may determine that the first input is received from the user.

In response to reception of the first input, the electronic device 101 may display a UI 720 for adjusting magnification on a portion of the display 510, as shown in FIG. 7B. The time point at which the electronic device 101 activates the remaining cameras different from a currently activated camera capturing the preview image 520, among the plurality of cameras, may correspond to the time point at which the electronic device 101 determines that the first input is received.

For example, it is assumed that the preview image 520 has a magnification of 1.0× before the first input is received, and the electronic device 101 activates a first camera (e.g., the first camera 310-1 of FIG. 5C) equipped with a wide-angle lens, among the plurality of cameras. In response to reception of the first input, the electronic device 101 may activate one or more of the remaining cameras from among the plurality of cameras based on the magnification range of the first camera. For example, if the electronic device 101 further includes a second camera (e.g., the second camera 310-2 of FIG. 5C), which is equipped with a standard lens and a third camera, and based on a telephoto lens (e.g., the third camera 310-3 of FIG. 5C), the electronic device 101 may activate the second camera, which has a magnification range relatively close to the magnification range of the activated first camera, among the second camera and the third camera.

In an embodiment, the electronic device 101 may activate different cameras among the plurality of cameras based on differentiations in the first input. For example, in a state where the first device, which is based on the wide-angle lens, is activated, if the electronic device 101 receives a first input, which starts at the portion 710 and moves at a designated speed or more, the electronic device 101 may simultaneously activate the second camera and the third camera or may activate the third camera (e.g., and exclude activation of other cameras).

Referring to FIG. 7B, in response to reception of the first input, the electronic device 101 may display, in the UI 720, an image including a plurality of markings indicating a scale of magnification, and at least one text box located adjacent to the image and displaying magnification and/or zoom ratio information. After displaying the UI 720, the electronic device 101 may receive a drag gesture, which is a second input received after the first input, for example, starting at a portion 710 within the UI 720 and stopping at a portion 715, different from the portion 710. The electronic device 101 may adjust the magnification of the preview image 520 based on the drag gesture. If the second input, received after the first input, is a drag gesture moving in a rightwards direction in the UI 720 (e.g., "increasing" according to the indicated scale), the electronic device 101 gradually increases the magnification of the preview image 520 from 1.0× using a digital zoom function.

In the case where the magnification of the preview image 520 corresponds to a designated threshold (e.g., 2.0×) for switching between the first camera and the second camera (e.g., the second camera 310-2 of FIG. 5C), which is based on the standard lens, the electronic device 101 may switch the camera used to display the preview image 520 from the first camera to the second camera. As described above, since the second camera is activated by the first input, which is received before the second input, the camera switch can be seamlessly performed at a time point corresponding to the designated threshold. After the camera used to display the preview image 520 is changed from the first camera to the second camera, the electronic device 101 according to an embodiment may further activate the remaining cameras (e.g., the third camera, having a magnification range adjacent to a magnification range of the second camera) among the plurality of cameras, based on the magnification range of the second camera.

Activating the remaining cameras except for the camera used to display the preview image 520, by the electronic device 101, may be terminated at least partially based on the ceasing of the second input. For example, if a second input, such as a drag gesture, is terminated at the point 715 and then no additional input is received in the UI 720 for a designated time, the electronic device 101 may terminate display of the UI 720 and deactivate the remaining cameras except for the camera used to display the preview image 520.

Since the electronic device 101 according to certain embodiments activates a camera, which is to be switched by a second input, based on the first input which is performed in the UI 720 and received before the second input for magnification adjustment, a delay occurring due to the camera switching by the second input can be reduced. In addition to the various gestures (a pinch-to-zoom gesture and a drag gesture) performed on the display 510, described with reference to FIGS. 6A to 6B and FIGS. 7A to 7B, the electronic device 101 according to certain embodiments may adjust the magnification of the preview image 520 and perform switching between the plurality of cameras in response to reception of input having a different form distinct from a touch gesture.

Figure 8A:
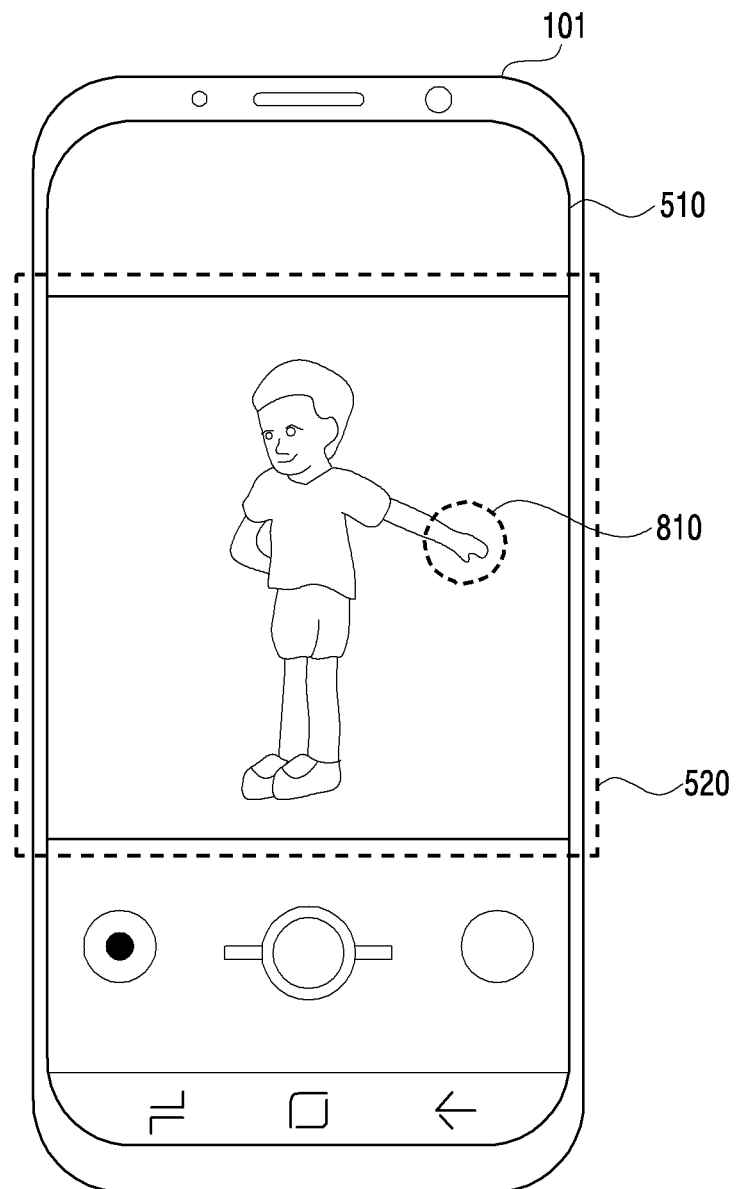
FIG. 8A is an example diagram illustrating an operation of adjusting the magnification of at least one camera among a plurality of cameras, based on the movement of an external object included in a preview image, by an electronic device according to an embodiment.
Figure 8B:
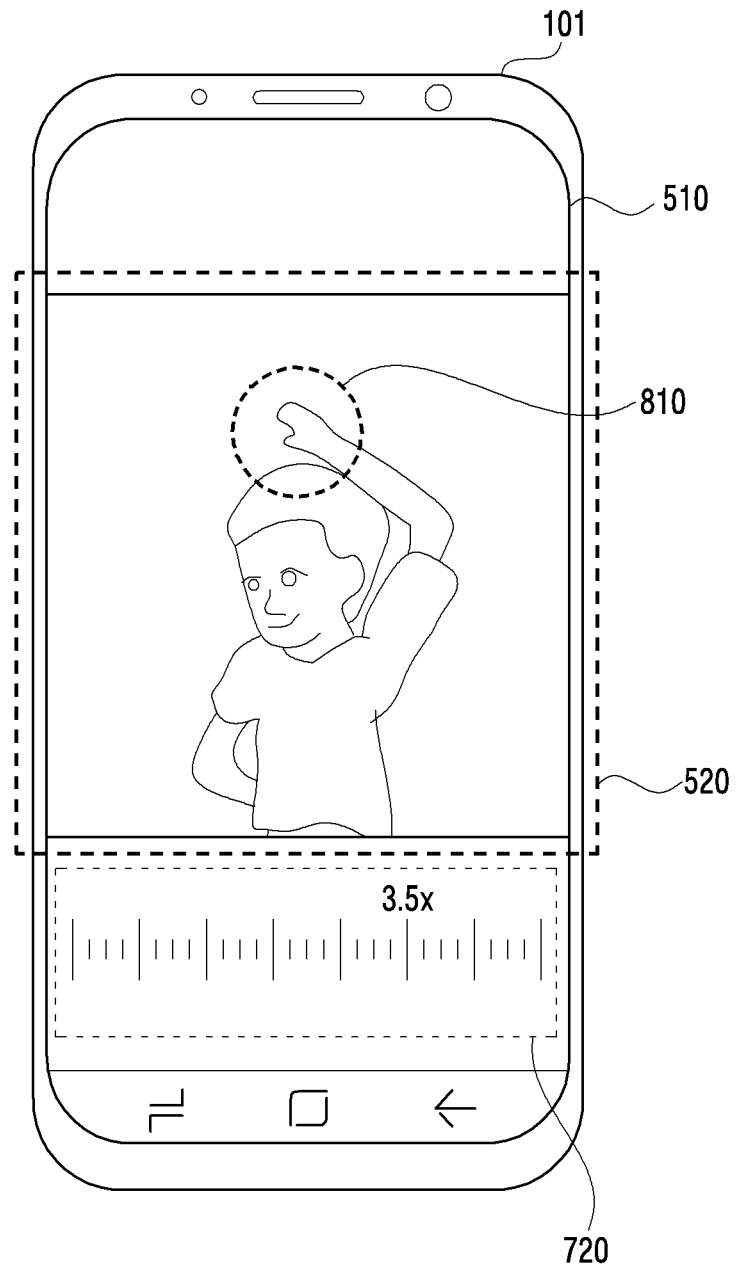
FIG. 8B is an example diagram illustrating an operation of adjusting the magnification of at least one camera among a plurality of cameras, based on the movement of an external object included in a preview image, by an electronic device according to an embodiment.

FIG. 8A is an example diagram illustrating an operation of adjusting the magnification of at least one camera among a plurality of cameras based on the movement of an external object 810 included in a preview image 520 by an electronic device 101 according to an embodiment, and FIG. 8B is an example diagram illustrating an operation of adjusting the magnification of at least one camera among a plurality of cameras based on the movement of an external object 810 included in a preview image 520 by an electronic device 101 according to an embodiment. The electronic device 101 of FIGS. 8A to 8B may correspond to the electronic device 101 of FIGS. 1, 3, 5A, 5B, 6A, 6B, 7A, and 7B. For example, the electronic device 101 of FIGS. 8A to 8B may perform at least one of operations of FIG. 4.

In an embodiment, the electronic device 101 may adjust the magnification of the preview image 520 based on a user's gesture captured by one or more of the plurality of cameras (and depicted within the preview image 520). For example, as illustrated in FIG. 8A, the electronic device 101 may detect a user in an image acquired from a camera used to display the preview image 520. The user and/or the user's gesture may be detected using object recognition techniques applicable to digital imagery, the techniques of which are beyond the scope of this disclosure. The user may also adjust the magnification of the preview image 520 based on a voice command and/or a motion, without touching the electronic device 101. For example, the second input for magnification adjustment may include a user's motion of moving the user's palm in a designated direction (e.g., upwards and/or downwards). The form of the second input is not limited to the above example, and may include, for example, a user's motion of adjusting the distance between the two palms of the user.

The electronic device 101 may identify the first input, which is to be received before the second input, using the activated camera. For example, the first input may include a motion of unfolding one's palms. If a user exposes an external object, such as a palm, toward the electronic device 101 and/or a camera of the electronic device 101, the electronic device 101 may identify the first input using object-recognition (e.g., recognizing a palm), for example. Referring to FIG. 8A, the electronic device 101 may identify a portion in which an external object 810 related to the first input is captured, in the preview image 510. In response to the identification of the first input, the electronic device 101 may activate another camera distinct from the camera corresponding to the preview image 520, among the plurality of cameras.

The user may expose the palm towards the electronic device 101 and then move the palm upwards and/or downwards. FIG. 8B illustrates a UI 720 displayed, by the electronic device 101, in the display 510 according to the reception of the first input by the user's palm moving. For example, if the user moves the palm upward, the electronic device 101 may gradually increase the magnification of the preview image 520 according to the moving distance and/or moving speed of the palm. If the magnification of the preview image 520 corresponds to a designated threshold for switching between the plurality of cameras, the electronic device 101 may perform switching between the plurality of cameras. For example, the electronic device 101 may switch the camera used to display the preview image 520 from a camera having a relatively low magnification to a camera having a relatively high magnification. In another example, if the user moves the palm downwards, the electronic device 101 may gradually reduce the magnification of the preview image 520 according to the moving distance and/or a movement speed of the palm. In this case, the camera used to capture the preview image 520 and/or an image may be switched from a camera having a relatively high magnification to a camera having a relatively low magnification.

The electronic device 101 according to an embodiment may display, in the display 510 (e.g., in the UI 720), a result of changing the magnification of the preview image 520 and/or a result of switching the camera. In an embodiment, the electronic device 101 may output the result of changing the magnification of the preview image 520 and/or the result of switching the camera based on a voice signal and/or a haptic signal (e.g., a haptic signal based on a vibration motor). For example, referring to FIG. 8B, in response to adjustment of the magnification of the preview image 520 based on the movement of the user's palm, the electronic device 101 may display the adjusted magnification (e.g., a numerical value, such as 3.5×) in the UI 720 and output a voice signal indicating a magnification (for example, "a magnification has been changed to a magnification of 3.5 times"), using a speaker of the electronic device 101.

Figure 9:
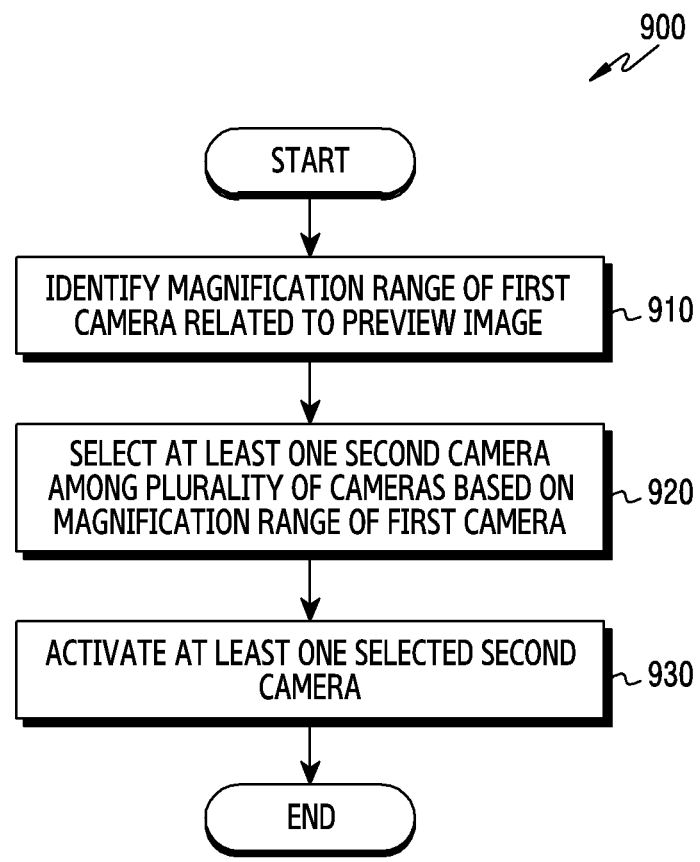
FIG. 9 is a flowchart illustrating an operation of activating at least one camera among a plurality of cameras by an electronic device according to certain embodiments.

FIG. 9 is a flowchart 900 illustrating an operation of activating at least one camera among a plurality of cameras, by an electronic device according to certain embodiments. The electronic device of FIG. 9 may correspond to the electronic device 101 of FIGS. 1 and 3. For example, the operation of FIG. 9 may be performed by the electronic device 101 and/or the processor 120 of FIG. 3. The operation of FIG. 9 may, for example, be associated with at least some (e.g., operations 420 and 430 of FIG. 4) of operations of FIG. 4. For example, in response to reception of the first input based on operation 410 of FIG. 4, the electronic device may perform at least one of operations of FIG. 9.

Referring to FIG. 9, in operation 910, an electronic device according to certain embodiments may identify the magnification range of a first camera related to a preview image. In response to the first input, which is received before the second input, which is received in order to adjust the magnification, the electronic device may perform operation 910. The first camera may be activated to display a preview image in the display of the electronic device before the first input is received.

In an embodiment, the electronic device may identify a first camera, which is used to obtain an image stored in a buffer of a memory, among a plurality of cameras. In response to the identification of the first camera, the electronic device may identify the magnification range of the identified first camera, based on operation 910. In an embodiment, the electronic device may identify information related to the magnification range and/or the focal length of the first camera. The information may include a magnification range, which is adjustable based on the first camera, and/or a threshold of magnification, which becomes a reference for switching a camera, used for capturing an image, from the first camera to another camera.

Referring to FIG. 9, in operation 920, the electronic device according to certain embodiments may select at least one second camera from among the plurality of camera, based on a magnification range of the first camera, which is identified based on operation 910. The second camera may be another camera distinct from the first camera, among the plurality of cameras included in the electronic device. For example, the electronic device may select a camera that has a magnification range proximate/adjacent to a magnification range of the first camera, among the plurality of cameras. For example, the electronic device may select the second camera based on an ability to transition from the magnification range of the first camera to the magnification range of the second camera smoothly upon reaching a designated threshold.

In the example of FIG. 5C, if the third camera 310-3 including a telephoto lens is activated, the electronic device may select the second camera 310-2 including a standard lens, based on operations 910 and 920. The magnification range of the second camera 310-2 may adjacent to a magnification range of the third camera 310-3. In the case where the preview image is displayed based on the second camera 310-2 including a standard lens, the electronic device may select both the first camera 310-1 including the wide-angle lens and the third cameras 310-3 including the telephoto lens, based on operations 910 and 920. The magnification ranges of the first camera 310-1 and the third camera 310-3 may adjacent to a magnification range of the second camera 310-2. In the case where the preview image is displayed based on the first camera 310-1, the electronic device may perform operations 910 and 920 in response to the first input, and thus may select the second camera 310-2, which has a magnification range adjacent to the magnification range of the first camera 310-1.

In an embodiment, the electronic device may select at least one second camera from among the plurality of cameras, based on the magnification range of the first camera and the first input. Referring to FIG. 5C, in response to reception of a drag gesture (for example, a drag gesture that starts within a designated portion 710 of the display 510 of FIG. 7A), which is performed at a designated speed or higher in a state where the third camera 310-3 is activated, the electronic device may select not only the second camera 310-2 having a magnification range abutting the magnification range of the third camera 310-3, but also the first camera 310-1.

Referring to FIG. 9, in operation 930, the electronic device according to certain embodiments may activate at least one second camera, selected based on operation 920. In an embodiment, the electronic device may allocate a buffer, which is to be used for storing an image, to at least one second camera. In an embodiment, the electronic device may transmit, to the at least one second camera, a command (e.g., DMA ON) which utilizes an image acquired by the at least one second camera to be stored in the allocated buffer. The at least one second camera may enter an activated state from a sleep state based on operation 920. The at least one second camera may be used to capture an image, which is acquired from an image sensor based on a designated period (e.g., a period of a Vsync signal), to be stored in a designated portion (e.g., the buffer) of the memory. After activation of the at least one second camera, the electronic device may, for example, based on operations 440 to 470 of FIG. 4, switch the camera used to display the preview image, between the first camera and the at least one second camera.

Figure 10:
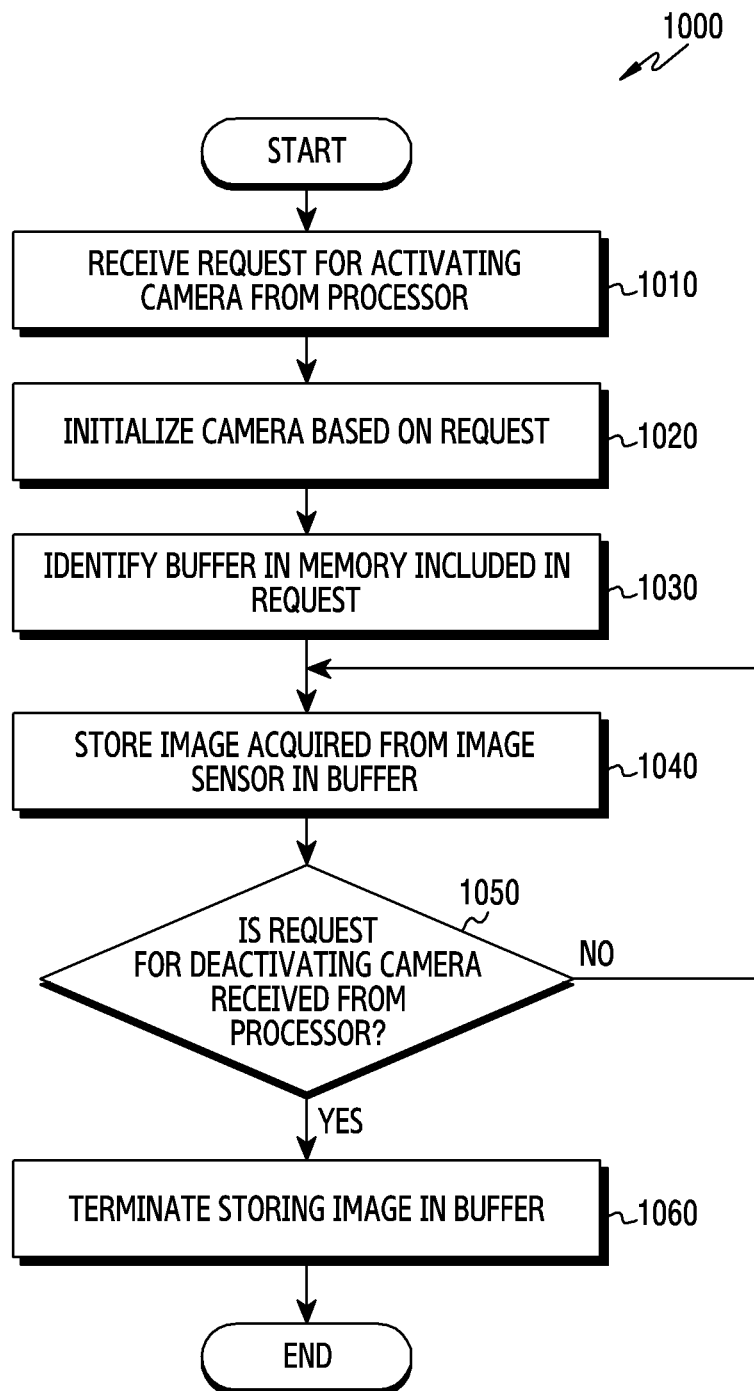
FIG. 10 is a flowchart illustrating an operation performed by at least one of a plurality of cameras included in an electronic device according to certain embodiments.

FIG. 10 is a flowchart 1000 illustrating an operation performed by at least one of a plurality of cameras included in an electronic device according to certain embodiments. The electronic device of FIG. 10 may correspond to the electronic device 101 of FIGS. 1 and 3. For example, operations of FIG. 10 may be performed by the electronic device 101 and/or at least one of the plurality of cameras 310-1 and 310-2 of FIG. 3. Operations of FIG. 10 may, for example, be associated with at least some of operations of FIG. 4 and/or operations of FIG. 9.

Referring to FIG. 10, in operation 1010, a camera of an electronic device according to certain embodiments may receive a request for activation of a camera from a processor. The processor may correspond to, for example, the processor 120 of FIG. 1 and/or FIG. 3. In an embodiment, the processor may transmit the request to the camera, based on operation 430 of FIG. 4 and/or operation 930 of FIG. 9. Before receiving the request, the state of the camera may correspond to a sleep state.

Referring to FIG. 10, in operation 1020, a camera of an electronic device according to certain embodiments may be initialized based on the request. In an embodiment, the camera may be initialized in response to reception of the request. The initialization of the camera may include initialization of an image sensor and/or initialization of an ISP connected to the image sensor.

Referring to FIG. 10, in operation 1030, a camera of an electronic device according to certain embodiments may identify a buffer in a memory, which is included in the request. In an embodiment, after the initialization, the camera may identify the buffer. The buffer, which is a designated portion of a memory, may include, for example, a queue for storing a plurality of images continuously output from the image sensor, based on a first-in first-out (FIFO) scheme. In an embodiment, the camera may identify the buffer by extracting an address of the buffer in the memory, which is included in the request of operation 1010.

Referring to FIG. 10, in operation 1040, a camera of an electronic device according to certain embodiments may store the image, acquired from the image sensor, in the identified buffer. In an embodiment, in response to identifying the buffer based on operation 1030, the image, which is acquired from the image sensor of the camera, may be stored in the identified buffer. The storing of the image in the buffer by the camera may be performed based on a signal, for example a Vsync signal, which has a designated period. The image stored in the buffer may be used for displaying the preview image based on operations 460 and 470 of FIG. 4, for example.

Referring to FIG. 10, in operation 1050, a camera of an electronic device according to certain embodiments may determine whether a request for deactivation thereof is received from a processor. In an embodiment, in a state in which the image acquired from the image sensor is stored in a buffer based on operation 1040, the electronic device may receive a request for deactivation of a camera from the processor. In an embodiment, the processor may request deactivation of the camera at least partially based on the ceasing of the second input. In an embodiment, if the camera is used to display the preview image, the processor may not request deactivation of the camera even after the ceasing of the second input, and may request deactivation of the camera based on other events, such as termination of the camera application.

In the case where a request for deactivation of the camera is not received from the processor (indicated by "No" in reference numeral 1050), the electronic device may maintain storage of the image, which is acquired from the image sensor, in the buffer, for example based on operation 1040. In the case where a request for deactivation of the camera is received from the processor (indicated by "Yes" in reference numeral 1050), the camera of the electronic device according to certain embodiments may terminate storage of the image in the buffer, in operation 1060 (e.g., the image may be deleted).

In an embodiment, in response to reception of a request associated with deactivation of the camera, the camera may enter a sleep state from an activated state. In response to entering the sleep state, the camera may stop storing the image in the buffer. In an embodiment, the camera, which has entered the sleep state based on operation 1060, may receive again a request related to activation of the camera from the processor. In this case, the camera may resume storing the image in the buffer based on the operations 1030 and 1040 without performing initialization of the camera based on the operation 1020.

Figure 11:
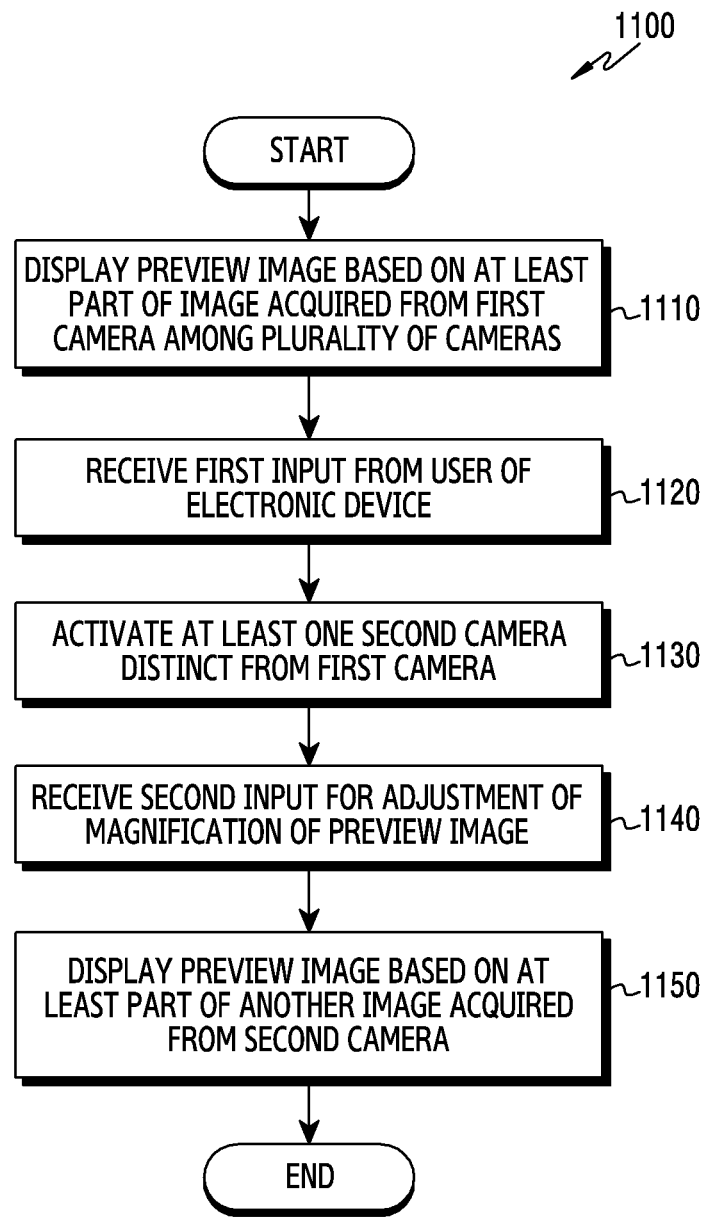
FIG. 11 is a flowchart illustrating an operation of an electronic device according to certain embodiments.

FIG. 11 is a flowchart 1100 for illustrating an operation of an electronic device according to certain embodiments. The electronic device of FIG. 11 may correspond to the electronic device 101 of FIGS. 1 and 3. For example, the operation of FIG. 11 may be performed by the electronic device 101 and/or the processor 120 of FIG. 3. The operation of FIG. 11 may be associated with at least some of operations of FIG. 4, for example. The operation of FIG. 11 may be performed by, for example, executing a designated application such as a camera application.

Referring to FIG. 11, in operation 1110, an electronic device according to certain embodiments may display a preview image based on at least a part of an image acquired from a first camera among a plurality of cameras. In an embodiment, the first camera may enter an activated state in order to display the preview image, and the remaining cameras except the first camera among the plurality of cameras may remain in a sleep state. The preview image may be displayed on at least a portion of the display of the electronic device, and may be displayed together with at least one visual element (e.g., the visual element 530 of FIG.

5B) for controlling the plurality of cameras. In an embodiment, the electronic device may perform operation 1110 similar to operation 410 of FIG. 4.

Referring to FIG. 11, in operation 1120, an electronic device according to certain embodiments may receive a first input from a user of the electronic device. The first input may be an input that is defined to be received prior to reception of a second input for adjustment of the magnification. The first input may be an input that needs to be received before the second input. For example, the first input may include at least one of a user's gesture for simultaneously touching at least two contacts 610 and 620 of the preview image 520 of FIG. 6A, a user's gesture that starts at a point 710 within the designated visual element 530 of FIG. 7A and is dragged outside the visual element 530, and a voice signal including a wake-up command and a user's gesture showing a designated external object of FIG. 8A. In an embodiment, the electronic device may perform operation 1120 similar to operation 420 of FIG. 4.

Referring to FIG. 11, in operation 1130, the electronic device according to certain embodiments may activate at least one second camera distinct from the first camera. In an embodiment, in response to reception of the first input based on operation 1120, the electronic device may activate the at least one second camera. For example, the electronic device may perform operation 1130 similar to operations 430 of FIG. 4 and/or operations 920 and 930 of FIG. 9. The at least one second camera may enter an activated state based on at least one of the operations of FIG. 10.

Referring to FIG. 11, in operation 1140, the electronic device according to certain embodiments may receive a second input adjusting a magnification level of the preview image. For example, the second input may be continuously received after the first input. For example, the second input may include at least one of a pinch-to-zoom gesture performed in FIG. 6B, a gesture performed within the UI 720 of FIG. 7B, and a voice signal including a command related to the moving and/or magnification adjustment of the designated external object in FIG. 8B. In an embodiment, the electronic device may perform operation 1140 similar to operation 440 of FIG. 4.

Referring to FIG. 11, in operation 1150, an electronic device according to certain embodiments may display a preview image based on at least a part of another image (e.g., a second image) acquired from a second camera. In an embodiment, the electronic device may perform operation 1150 similar to operations 450 and 460 of FIG. 4. In a state where the preview image is displayed based on at least a part of another image, the electronic device may stop displaying the preview image, which is performed based on at least a part of the image acquired from the first camera. That is, based on the magnification adjustment of operation 1140, the device may activate a second camera having the desirable magnification characteristics and transition to displaying a preview image based at least partly on image information captured by the second camera. This may be advantageous in situations in which the user's custom magnification level exceeds or is in danger of exceeding the magnification characteristics of the originally activated camera. Thus, the device may execute a switch to the second camera such that the user's ability to customize magnification is not impaired or limited by the first camera.

An electronic device according to certain embodiments may increase the number of activated cameras, among the plurality of cameras, in response to a first designated input, for example, a first input which is received before a second input for adjustment of magnification. The camera that is additionally activated in response to the first input may be used to display the preview image by magnification adjustment according to a second input. For example, if the adjusted magnification according to the second input enters a magnification range corresponding to the additionally activated camera, the electronic device may display the preview image using an image acquired from the additionally activated camera. In response to identification that the second input is terminated, the electronic device may decrease the number of activated cameras. For example, the electronic device may deactivate the remaining cameras except for the camera used to display the preview image, among the plurality of cameras.

According to certain embodiments, an electronic device may include: a display; a plurality of cameras; a memory for storing instructions; and at least one processor operably coupled with the display, the plurality of cameras, and the memory, such that, if the instructions are executed, the at least one processor is configured to: display, in the display, a preview image based on at least a part of an image, which is acquired from a first camera among the plurality of cameras; receive a first input in a state where the preview image is displayed, such that the first input is received before a second input for adjustment of a magnification of the preview image; in response to reception of the first input, activate (enable) a second camera among the plurality of cameras; receive the second input for adjustment of the magnification of the preview image in a state where another image distinct from the image is acquired using the activated second camera; and display the preview image, based on at least a part of the another image and at least partially based on reception of the second input.

In an electronic device according to an embodiment, if the instructions are executed, the at least one processor is configured to: in response to reception of the first input, activate the second camera having a magnification range distinct from a designated first magnification range associated with the first camera; and in response to identification that the magnification of the preview image enters a magnification range of the second camera according to the second input, change an image used to display the preview image from the image acquired from the first camera to another image acquired from the second camera.

In an electronic device according to an embodiment, if the instructions are executed, the at least one processor is configured to cease display of the preview image, based on at least a part of the image acquired from the first camera and at least partially based on the reception of the second input.

In an electronic device according to an embodiment, if the instructions are executed, the at least one processor is configured to maintain acquiring the image from the first camera in a state where the preview image is displayed based on at least a part of the another image.

In an electronic device according to an embodiment, if the instructions are executed, the at least one processor is configured to: activate the second camera in response to reception of the first input including a gesture touching at least two contacts within the display; and adjust a magnification of the preview image according to a distance between the at least two contacts within the display, at least partially based on the reception of the second input including a gesture for adjusting the distance between the at least two contacts.

In an electronic device according to an embodiment, if the instructions are executed, the at least one processor is configured to: based on a moving speed or a distance between the at least two contacts moving within the display, change an image used to display the preview image from the image acquired from the first camera to the another image acquired from the second camera.

In an electronic device according to an embodiment, if the instructions are executed, the at least one processor is configured to: in response to reception of the first input for displaying a user interface (UI) for adjustment of the magnification, display the UI in the display; and receive, in a state where the UI is displayed, the second input based on a point that touches at a portion of the display on which the UI is displayed.

In an electronic device according to an embodiment, if the instructions are executed, the at least one processor is configured to: in response to reception of the second input including a touch gesture performed in a designated area of the UI or a drag gesture terminated in the designated area, change an image used to display the preview image from the image acquired from the first camera to another image acquired from the second camera.

In an electronic device according to an embodiment, if the instructions are executed, the at least one processor is configured to: identify termination of the second input in the state where the preview image is displayed based on at least a part of the another image; and in response to identification of the termination of the second input, deactivate (disable) the first camera.

In an electronic device according to an embodiment, if the instructions are executed, the at least one processor is configured to: in response to identification of the termination of the second input, cease storing the image acquired from the first camera in the memory.

In an electronic device according to an embodiment, if the instructions are executed, the at least one processor is configured to: in response to activation of the second camera, store the image, acquired from the first camera, and the another image, acquired from the activated second camera, in at least one buffer based on the memory.

A method of an electronic device according to certain embodiments may include: displaying, in a display of the electronic device, a preview image based on at least a part of an image, which is acquired from a first camera among the plurality of cameras of the electronic device; receiving a first input in a state where the preview image is displayed, the first input is received before a second input for adjustment of a magnification of the preview image; in response to reception of the first input, activating a second camera among the plurality of cameras; receiving the second input for adjustment of the magnification of the preview image in a state where another image, distinct from the image, is acquired using the activated second camera; and displaying the preview image, based on at least a part of the another image and at least partially based on reception of the second input.

According to an embodiment, the activation of the second camera includes: in response to reception of the first input, activating the second camera having a magnification range distinct from a magnification range of the first camera; and the displaying of the preview image based on at least a part of the another image includes: in response to identification that the magnification of the preview image enters a magnification range of the second camera according to the second input, changing an image used to display the preview image from the image acquired from the first camera to another image acquired from the second camera.

According to an embodiment, the displaying the preview image based on at least a part of the another image includes ceasing displaying of the preview image, based on at least a part of the image acquired from the first camera.

According to an embodiment, the displaying the preview image based on at least a part of the another image includes maintaining to acquire the image from the first camera.

According to an embodiment, the reception of the first input includes receiving the first input including a gesture touching at least two contacts within the display, and the reception of the second input includes receiving the second input including a gesture for adjusting a distance between the at least two contacts.

According to an embodiment, the displaying of the preview image based on at least a part of the another image includes changing the image used to display the preview image, from the image acquired from the first camera to the another image acquired from the second camera, based on a moving speed or a distance between the at least two contacts within the display.

The method of the electronic device according to an embodiment further includes: displaying the UI in the display in response to reception of the first input for displaying a user interface (UI) for adjustment of the magnification, such that reception of the second input includes receiving, in a state where the UI is displayed, the second input based on a point that touches at a portion of the display on which the UI is displayed.

According to an embodiment, the displaying the preview image based on at least a part of the another image may include: in response to reception of the second input including a touch gesture performed in a designated area of the UI or a drag gesture terminated in the designated area, changing the image used to display the preview image, from the image acquired from the first camera to the another image acquired from the second camera.

According to an embodiment, a method of an electronic device may further include: identifying termination of the second input in a state where the preview image is displayed based on at least a part of the another image; and in response to the identification of the termination of the second input, deactivating the first camera.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to certain embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof Such a storage device may access a device that performs an embodiment of the disclosure via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and certain embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the disclosure. Therefore, the disclosure should not be defined as being limited to the embodiments, but should be defined by the appended claims and equivalents thereof

What is claimed is:

1. An electronic device, comprising:
a display;
a plurality of cameras;
a memory storing instructions; and
at least one processor operably coupled with the display, the plurality of cameras, and the memory,
wherein, the instructions are executable by the at least one processor to cause the electronic device to:
display, on the display, a preview acquired using a first camera from among the plurality of cameras, the preview including a sequence of images representing frames captured by the first camera, and a first image;
in response to receiving a first input while the preview acquired by the first camera is displayed, activate a second camera from among the plurality of cameras, wherein the first input is received and the second camera is activated before reception of any input adjusting a magnification level of the preview;
receive a second input for adjusting the magnification level of the preview when a second image, distinct from the first image, is acquired using the activated second camera; and
display the preview, based on at least a part of the second image and at least partially based on receiving the second input.

2. The electronic device of claim 1, wherein the second camera includes a magnification range at least partially distinct from a magnification range of the first camera, and
wherein the instructions are further executable by the at least one processor to cause the electronic device to:
in response to identifying that the magnification level of the preview is within the magnification range of the second camera after adjustment by the second input, change acquisition of the preview by the first camera to acquisition by the second camera.

3. The electronic device of claim 1, wherein the instructions are further executable by the at least one processor to cause the electronic device to:
terminate display of the preview, based on at least a part of the first image acquired by the first camera and at least partially based on receiving the second input.

4. The electronic device of claim 1, wherein the instructions are further executable by the at least one processor to cause the electronic device to:
maintain acquisition of the image from the first camera when the preview is displayed, based on at least a part of the second image acquired by the second camera.

5. The electronic device of claim 1, wherein the first input causing activation of the second camera includes a gesture touching at least two points on the display in absence of any movement of the gesture, and
wherein the second input for adjusting the magnification is received after activation of the second camera, the second input including physical movement of the gesture along a surface of the display, the movement changing a distance between the at least two points touching the display.

6. The electronic device of claim 5, wherein the instructions are further executable by the at least one processor to cause the electronic device to:
based on at least one of a velocity of the movement and the distance between the at least two points, change acquisition of the preview by the first camera to acquisition by the second camera.

7. The electronic device of claim 1, wherein the instructions are further executable by the at least one processor to cause the electronic device to:
in response to receiving the first input, displaying a user interface (UI) that controls adjustment of the magnification,
wherein the second input adjusting the magnification is received to a portion of the UI.

8. The electronic device of claim 7, wherein the UI includes a designated area, the instructions further executable by the at least one processor to cause the electronic device to
when second input is executed in the designated area, or when the second input includes a drag gesture that terminates in the designated area, change acquisition of the preview by the first camera to acquisition by the second camera.

9. The electronic device of claim 1, wherein the instructions are further executable by the at least one processor to cause the electronic device to
in response to detecting termination of the second input, deactivate the first camera.

10. The electronic device of claim 9, wherein the instructions are further executable by the processor to cause the electronic device to: delete the first image from the memory in response to the termination of the second input.

11. The electronic device of claim 1, wherein the instructions are further executable by the at least one processor to cause the electronic device to: in response to activation of the second camera, store the first image and the second image in at least one buffer of the memory.

12. A method of an electronic device, the method comprising:
displaying, on a display of the electronic device, a preview acquired from a first camera among a plurality of cameras of the electronic device, the preview including a sequence of images representing frames captured by the first camera, and a first image;
in response to receiving a first input while the preview acquired by the first camera is displayed, activating a second camera from among the plurality of cameras, wherein the first input is received and the second camera is activated before reception of any input adjusting a magnification level of the preview;

receiving a second input adjusting the magnification level of the preview while a second image, distinct from the first image, is acquired using the activated second camera; and displaying the preview, based on at least a part of the second image and at least partially based on receiving the second input.

13. The method of claim 12, wherein the second camera includes a magnification range at least partially distinct from a magnification range of the first camera, the method further comprising:

in response to identifying that the magnification level of the preview is within the magnification range of the second camera after adjustment by the second input, changing acquisition of the preview by the first camera to acquisition by the second camera.

14. The method of claim 12, further comprising:

terminating display of the preview, based on at least a part of the first image acquired by the first camera and at least partially based on receiving the second input.

15. The method of claim 12, further comprising:

maintaining acquisition of the first image from the first camera when the preview is displayed, based on at least a part of the second image acquired by the second camera.

16. The method of claim 12, wherein the first input causing activation of the second camera includes a gesture touching at least two points on the display in absence of any movement of the gesture, and wherein the second input for adjusting the magnification is received after activation of the second camera, the second input including physical movement of the gesture along a surface of the display, the movement changing a distance between the at least two points touching the display.

17. The method of claim 16, further comprising: based on at least one of a velocity of the movement and the distance between the at least two points, changing acquisition of the preview by the first camera to acquisition by the second camera.

18. The method of claim 12, further comprising:

in response to receiving the first input, displaying a user interface (UI) that controls adjustment of the magnification, wherein the second input adjusting the magnification is received to a portion of the UI.

19. The method of claim 18, wherein the UI includes a designated area, and the method further comprises:

when second input is executed in the designated area, or when the second input includes a drag gesture that terminates in the designated area, changing acquisition of the preview by the first camera to acquisition by the second camera.

20. The method of claim 12, further comprising:

in response to detecting termination of the second input, deactivating the first camera.

* * * * *